United States Patent
Qiu et al.

(10) Patent No.: US 12,547,305 B2
(45) Date of Patent: *Feb. 10, 2026

(54) ADDING VIRTUAL OBJECT IN VIRTUAL ENVIRONMENT

(71) Applicant: TENCENT TECHNOLOGY (SHENZHEN) COMPANY LIMITED, Guangdong (CN)

(72) Inventors: Meng Qiu, Shenzhen (CN); Jiaqi Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,691

(22) Filed: Apr. 17, 2023

(65) Prior Publication Data

US 2023/0251771 A1   Aug. 10, 2023

Related U.S. Application Data

(63) Continuation of application No. 17/230,720, filed on Apr. 14, 2021, now Pat. No. 11,675,488, which is a
(Continued)

(30) Foreign Application Priority Data

Jan. 30, 2019 (CN) .......................... 201910093429.2

(51) Int. Cl.
*G06F 3/0482* (2013.01)
*A63F 13/2145* (2014.01)
(Continued)

(52) U.S. Cl.
CPC ...... *G06F 3/04845* (2013.01); *A63F 13/2145* (2014.09); *A63F 13/42* (2014.09);
(Continued)

(58) Field of Classification Search
CPC ............ G06F 3/04845; G06F 3/04815; G06F 3/0482; G06F 3/04842; A63F 13/2145; A63F 13/42
See application file for complete search history.

(56) References Cited

U.S. PATENT DOCUMENTS 9,004,997 B1    4/2015 Prosin et al.
11,532,141 B1 * 12/2022 Vierra ................ G06Q 10/0631
(Continued)

FOREIGN PATENT DOCUMENTS

CN        105760076 A    7/2016
CN        106598465 A    4/2017
(Continued)

OTHER PUBLICATIONS

Android Gameplay Weekly, WingSuit Simulator 3D-Android Gameplay-Fly To The Sky! Feb. 7, 2017, pp. 1-6, at https://www.youtube.com/watch?v=Xp6PUQYI3Jo (last visited Jun. 23, 2021) (Year: 2017).
(Continued)

*Primary Examiner* — Phenuel S Salomon
(74) *Attorney, Agent, or Firm* — ArentFox Schiff LLP

(57) ABSTRACT

A method for adding a virtual object in a virtual environment is provided. An image of the virtual environment is displayed based on a position of a virtual movable object in the virtual environment. An object controller corresponding to the virtual object to be added in the virtual environment is displayed. The object controller includes a control region and a graphical element configured to move within the control region according to a first touch operation. A first position of the virtual object in the virtual environment is determined according to a position of the graphical element within the control region when the first touch operation ends.
(Continued)

The virtual object is added in the virtual environment at the determined first position of the virtual object.

20 Claims, 15 Drawing Sheets

Related U.S. Application Data continuation of application No. PCT/CN2020/072821, filed on Jan. 17, 2020.

(51) Int. Cl.
*A63F 13/42* (2014.01)
*G06F 3/04815* (2022.01)
*G06F 3/04842* (2022.01)
*G06F 3/04845* (2022.01)

(52) U.S. Cl.
CPC ........ *G06F 3/04815* (2013.01); *G06F 3/0482* (2013.01); *G06F 3/04842* (2013.01)

(56) References Cited

U.S. PATENT DOCUMENTS

| | | | |
|---|---|---|---|
| 2009/0181736 A1* | 7/2009 | Haigh-Hutchinson | A63F 13/55 463/2 |
| 2010/0009733 A1* | 1/2010 | Garvin | A63F 13/10 463/37 |
| 2010/0045666 A1 | 2/2010 | Kornmann et al. | |
| 2012/0169610 A1 | 7/2012 | Berkes et al. | |
| 2012/0231861 A1* | 9/2012 | Champagne | A63F 13/245 463/6 |
| 2012/0322523 A1* | 12/2012 | Woodard | A63F 13/69 463/2 |
| 2013/0024806 A1 | 1/2013 | Funabashi et al. | |
| 2015/0317030 A1 | 11/2015 | Hada | |
| 2015/0324940 A1* | 11/2015 | Samson | G06Q 10/06313 705/7.23 |
| 2016/0266775 A1 | 9/2016 | Shin et al. | |
| 2017/0352186 A1* | 12/2017 | Dauphiny | A63F 13/73 |
| 2017/0354887 A1 | 12/2017 | Bollermann et al. | |
| 2018/0122138 A1* | 5/2018 | Piya | G06F 30/00 |
| 2018/0158251 A1* | 6/2018 | Pasek | G06T 19/20 |
| 2019/0299091 A1* | 10/2019 | Wu | G06F 3/04815 |
| 2020/0316466 A1* | 10/2020 | Wan | A63F 13/42 |
| 2021/0354039 A1* | 11/2021 | Wan | A63F 13/822 |

FOREIGN PATENT DOCUMENTS

| | | |
|---|---|---|
| CN | 108245885 A | 7/2018 |
| CN | 108355353 A | 8/2018 |
| CN | 108499105 A | 9/2018 |
| CN | 109840043 A | 6/2019 |
| JP | 2003-248843 A | 9/2003 |
| JP | 2005-293474 A | 10/2005 |
| JP | 2012-501016 A | 1/2012 |
| JP | 2016-193216 A | 11/2016 |
| JP | 2017-000575 A | 1/2017 |

OTHER PUBLICATIONS

Chinese Office Action Issued in Application on CN201910093429.2 dated Feb. 1, 2021, with concise English translation, (12 pages).
International Search Report Issued in Application PCT/CN2020/072821 dated Apr. 16, 2020, with English machine translation, (5 pages).
Office Action in JP2021521495, dated May 31, 2022 with English Translation, 9 pages.
Written Opinion Issued in Application PCT/CN2020/072821 dated Apr. 16, 2020 (6 pages).

* cited by examiner

ADDING VIRTUAL OBJECT IN VIRTUAL ENVIRONMENT

RELATED APPLICATION

This application is a continuation of U.S. application Ser. No. 17/230,720, filed on Apr. 14, 2021, which is a continuation of International Application No. PCT/CN2020/072821, filed on Jan. 17, 2020, which claims priority to Chinese Patent Application No. 201910093429.2, filed on Jan. 30, 2019, and entitled "METHOD AND APPARATUS FOR CONSTRUCTING BUILDING IN VIRTUAL ENVIRONMENT, DEVICE, AND STORAGE MEDIUM." The entire disclosures of the prior applications are hereby incorporated by reference in their entirety.

FIELD OF THE TECHNOLOGY

Embodiments of this application relate to the field of human-computer interaction, including a method and an apparatus for constructing a building in a virtual environment, a device, and a storage medium.

BACKGROUND OF THE DISCLOSURE

Devices such as a smartphone and a tablet computer are provided with many virtual environment-based applications.

In the foregoing virtual environment-based applications, a user can use virtual materials to build a wall, stairs, a house, and the like, but related construction can require at least the following three steps:

First, click a building button to open a menu of building materials.

Second, rotate a perspective to adjust a position where the building (constructed with a default building material) is placed.

Third, click a placing button to complete the construction.

If a non-default building material is used, a step of "selecting a required building material" further needs to be added.

Because the construction includes many steps, during construction of a building in a virtual environment, the construction of the building cannot be completed quickly and efficiently, and the human-computer interaction efficiency is low.

SUMMARY

Embodiments of this application provide a method and an apparatus for constructing a building in a virtual environment, a device, and a storage medium, which can reduce building construction steps, thereby efficiently completing construction of a building and improving the human-computer interaction efficiency. The technical solutions can include the following aspects.

According to an aspect of this application, a method for constructing a target object in a virtual environment of an application is provided. In the method, a first picture of the virtual environment is displayed according to a first perspective corresponding to a first observation direction of a virtual movable object in the virtual environment. An object construction controller corresponding to the target object is displayed. A touch operation on the object construction controller is received. A target construction position of the target object is determined based on the touch operation, a target distance, and the first observation direction of the virtual movable object. A touch release operation corresponding to the touch operation is received. Further, the target object is constructed at the determined target construction position according to the touch release operation.

According to another aspect of this application, an apparatus for constructing a target object in a virtual environment of an application is provided. The apparatus includes processing circuitry. The processing circuitry is configured to display a first picture of the virtual environment according to a first perspective corresponding to a first observation direction of a virtual movable object in the virtual environment, and display an object construction controller corresponding to the target object. The processing circuitry is configured to receive a touch operation on the object construction controller, and determine a target construction position of the target object based on the touch operation, a target distance, and the first observation direction of the virtual movable object. The processing circuitry is configured to receive a touch release operation corresponding to the touch operation. Further, the processing circuitry is configured to construct the target object at the determined target construction position according to the touch release operation.

According to another aspect of this application, a terminal is provided, including a processor and a memory storing at least one instruction, at least one program, a code set, or an instruction set, the at least one instruction, the at least one program, the code set, or the instruction set being loaded and executed by the processor to implement the method for constructing the target object in the virtual environment of the application according to the foregoing aspects of this application and any one of the optional embodiments.

According to another aspect of this application, a non-transitory computer-readable storage medium, storing instructions which when executed by a processor cause the processor to perform a method for constructing a target object in a virtual environment of an application is provided. In the method, a first picture of the virtual environment is displayed according to a first perspective corresponding to a first observation direction of a virtual movable object in the virtual environment. An object construction controller corresponding to the target object is displayed. A touch operation on the object construction controller is received. A target construction position of the target object is determined based on the touch operation, a target distance, and the first observation direction of the virtual movable object. A touch release operation corresponding to the touch operation is received. Further, the target object is constructed at the determined target construction position according to the touch release operation.

For example, the technical solutions provided in the embodiments of this application can achieve at least the following beneficial effects:

displaying a first-perspective picture of an application, a building joystick control corresponding to a target building being superimposed and displayed on the first-perspective picture; receiving a touch operation triggered on the building joystick control; determining, based on the touch operation, a position at a target distance in a first observation direction in which the first perspective is located as a target construction position of the target building; receiving a touch release operation corresponding to the touch operation; and constructing the target building at the target construction position according to the touch release operation. In the foregoing target building construction process, a user completes, through the building joystick control corresponding to the target building, one touch and release operation to complete the construction of the target building at an aim point position of the first perspective, thereby implementing the fast and efficient construction of the target building in the virtual environment of the application; compared with conventional target building construction that requires three steps, the foregoing construction process reduces two steps and improves the human-computer interaction efficiency.

BRIEF DESCRIPTION OF THE DRAWINGS

To describe technical solutions of embodiments of this application more clearly, the following briefly introduces the accompanying drawings required for describing the embodiments. The accompanying drawings in the following description show merely some embodiments of this application, and a person of ordinary skill in the art may still derive other accompanying drawings according to the accompanying drawings.

DESCRIPTION OF EMBODIMENTS

Figure 1:
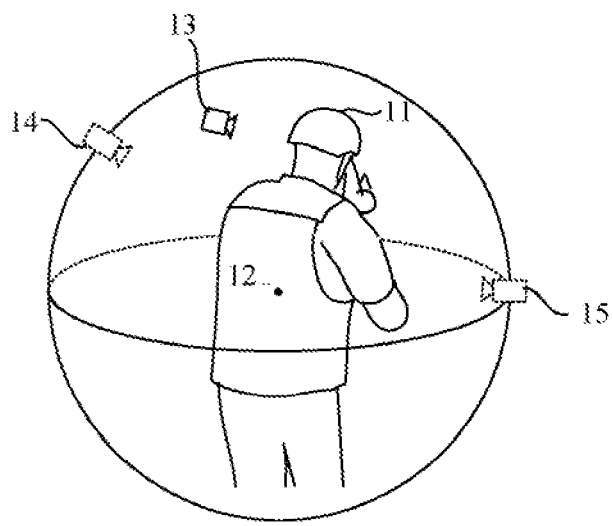
FIG. 1 is a schematic diagram of a camera model according to an exemplary embodiment of this application.

To make objectives, technical solutions, and advantages of this application clearer, implementations of this application are described below in further detail with reference to the accompanying drawings.

First, the following explains several terms involved in the embodiments of this application.

Virtual environment: a virtual environment displayed (or provided) by an application when run on a device, such as a terminal. The virtual environment may be a simulated environment of the real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a 3D virtual environment. The following embodiments are described by using an example in which the virtual environment is a 3D virtual environment, but this application is not limited thereto.

Virtual object: a movable object in a virtual environment. The movable object may be at least one of a virtual character, a virtual animal, and a cartoon character. Optionally, in a case that the virtual environment is a 3D virtual environment, the virtual object is a 3D model created based on a skeletal animation technology. Each virtual object has a shape and size in the 3D virtual environment, and occupies some space in the 3D virtual environment.

Building: a virtual building constructed in a virtual environment. The virtual building may be virtual stairs, a virtual wall, a virtual floor, a virtual roof, or the like. Optionally, when the virtual environment is a 3D virtual environment, the virtual building is a 3D model. Each virtual building has a shape and size in the 3D virtual environment, and occupies some space in the 3D virtual environment.

A user can construct a candidate building in the virtual environment. The candidate building is a building that is pre-set in the application and that the user is allowed to build. A target building is a building that the user selects to build from the candidate buildings. Optionally, in a case that the 3D virtual environment is an environment in which at least two virtual objects fight against each other, the virtual building can be used for blocking an attack of an enemy. For example, in a case that the at least two virtual objects fight against each other, the user can block an attack of an enemy by building a virtual wall in a direction facing the attack of the enemy. Optionally, the virtual object can move across an obstacle in a forward direction by using a constructed virtual building. For example, in a case that a river appears in the forward direction of the virtual object, the user assists the virtual object to move across the river by constructing virtual stairs over the river.

Perspective: an observation angle for observation from a first-person perspective or a third-person perspective of a virtual object in a virtual environment. Optionally, in the embodiments of this application, the perspective is an angle for observing the virtual object by using a camera model in the virtual environment. An observation direction is a direction pointed to by a lens of the camera model in the virtual environment.

Optionally, the camera model automatically follows the virtual object in the virtual environment. That is, when a position of the virtual object in the virtual environment changes, a position of the camera model following the virtual object in the virtual environment changes simultaneously, and the camera model is always within a preset distance range from the virtual object in the virtual environment. Optionally, in the automatic following process, relative positions of the camera model and the virtual object remain unchanged.

Camera model: a 3D model located around a virtual object in a 3D virtual environment. When a first-person perspective is adopted, the camera model is located near the head of the virtual object or at the head of the virtual object. When a third-person perspective is adopted, the camera model may be located behind the virtual object and bound to the virtual object, or may be located at any position at a preset distance from the virtual object. The virtual object located in the 3D virtual environment may be observed from different angles through the camera model. Optionally, when the third-person perspective is a first-person over-shoulder perspective, the camera model is located behind the virtual object, such as the head and the shoulders of the virtual character. Optionally, in addition to the first-person perspective and the third-person perspective, the perspective also includes other perspectives, such as a top perspective. When the top perspective is used, the camera model may be located above the head of the virtual object. The top perspective is a perspective for observing the virtual environment at an angle from the air. Optionally, the camera model is not actually displayed in the 3D virtual environment. In other words, the camera model is not displayed in the 3D virtual environment displayed in a user interface (UI).

Description is made by using an example in which the camera model is located at any position at a preset distance from the virtual object. Optionally, one virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, for example, the camera model is rotated on a surface of a sphere with the rotation center as a sphere center. Any point of the virtual character may be the head or the torso of the virtual object, or any point around the virtual object. This is not limited in the embodiments of this application. Optionally, when the camera model observes the virtual object, a center of the perspective of the camera model points to a direction from a point on the spherical surface at which the camera model is located to the sphere center.

Optionally, the camera model may alternatively observe the virtual object at a preset angle in different directions of the virtual object.

For example, referring to FIG. 1, a point in a virtual object 11 is determined as a rotation center 12, and the camera model rotates around the rotation center 12. Optionally, the camera model is configured with an initial position, and the initial position is an upper rear position of the virtual object, such as a rear position of the body). For example, as shown in FIG. 1, the initial position is a position 13, and when the camera model rotates to a position 14 or a position 15, a perspective direction of the camera model changes as the camera model rotates.

The device in this application may be a terminal such as a portable laptop computer, a mobile phone, a tablet computer, an ebook reader, an electronic game console, a Moving Picture Experts Group Audio Layer IV (MP4) player, or the like.

Figure 2:
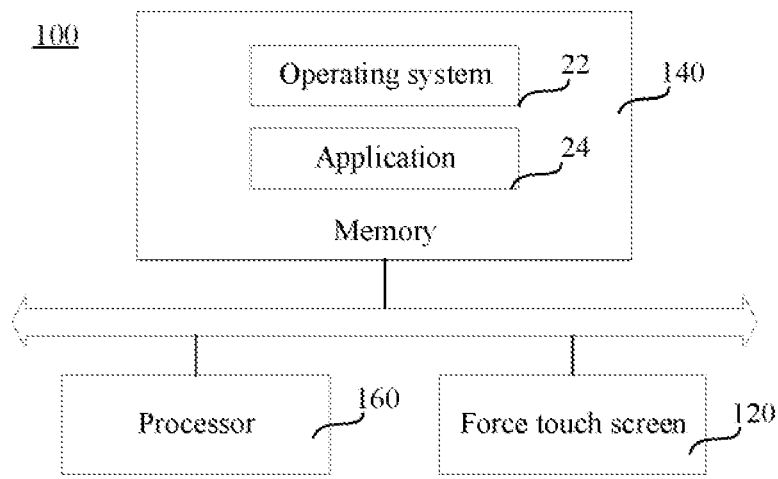
FIG. 2 is a structural block diagram of a device according to an exemplary embodiment of this application.

For a hardware structure, the terminal can include a force touch screen 120, a memory 140, and processing circuitry such as a processor 160, referring to a structural block diagram of the terminal shown in FIG. 2.

The force touch screen 120 may be a capacitive touch screen or a resistive touch screen. The force touch screen 120 is used for implementing interaction between the terminal and the user. In an embodiment of this application, the terminal obtains, by using the force touch screen 120, a related operation of building construction triggered by the user, such as a touch operation, a release operation corresponding to the touch operation, a drag operation, an unfolding operation, and a selection operation.

The memory 140 may include one or more computer-readable storage media, such as one or more non-transitory computer-readable storage mediums. The computer-readable storage medium can include at least one of a random access memory (RAM), a read-only memory (ROM), or a flash memory (Flash). An operating system 22 and an application 24 can be installed in the memory 140.

The operating system 22 is basic software provided for the application 24 to perform secure access to computer hardware. The operating system may be an Android system or an iOS system.

The application 24 is an application supporting a virtual environment, and the virtual environment includes a virtual object. Optionally, the application 24 supports an application of a 3D virtual environment. The application 24 may be any one of a virtual reality application, a 3D map program, a military simulation program, a third-person shooter (TPS) game, a first-person shooter (FPS) game, a multiplayer online battle arena (MOBA) game, and a multiplayer gunfight survival game. Optionally, the application 24 may be a standalone application, such as a standalone 3D game program, or may be an online network application.

The processor 160 may include one or more processing cores, for example, a 4-core processor or an 8-core processor. The processor 160 is configured to execute different instructions corresponding to different operations according to the related operation of building construction received on the force touch screen 120.

Figure 3:
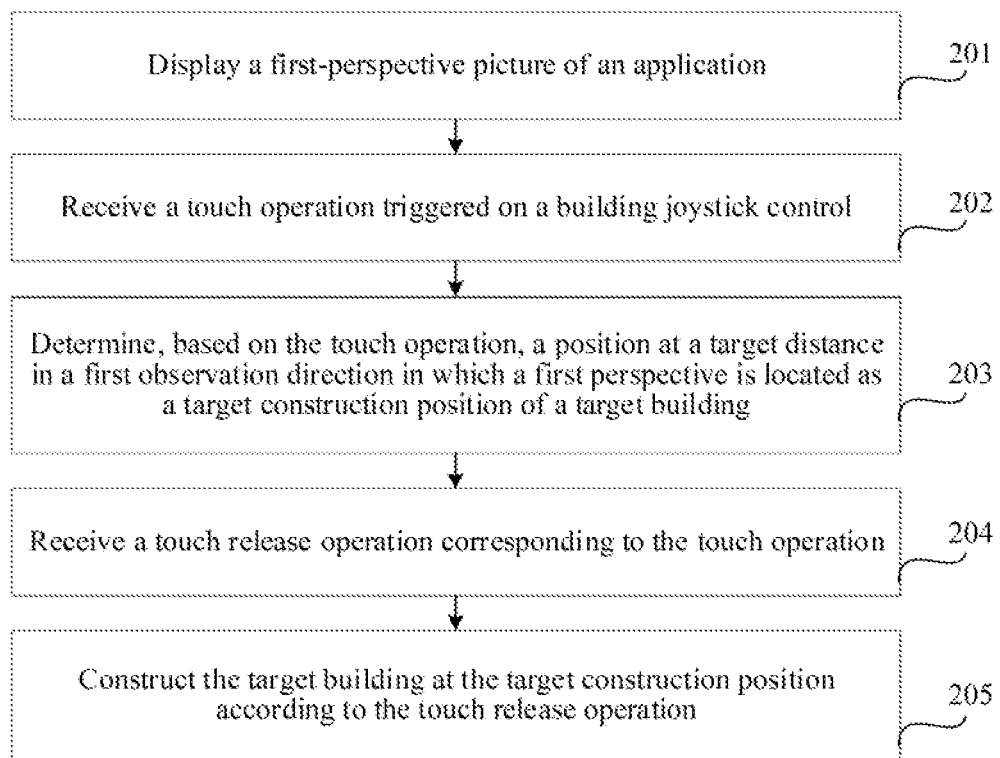
FIG. 3 is a flowchart of a method for constructing a building in a virtual environment according to an exemplary embodiment of this application.

FIG. 3 is a flowchart of a method for constructing an object, such as a building, in a virtual environment according to an exemplary embodiment of this application. The method applied to the terminal shown in FIG. 2 is used as an example for description. The method can include the following steps.

In step 201, a first-perspective picture of an application is displayed. For example, a first picture of the virtual environment is displayed according to a first perspective corresponding to a first observation direction of a virtual movable object in the virtual environment.

The first-perspective picture of the application is displayed on the terminal. The application may be at least one of a virtual reality application program, a 3D map application, a military simulation program, a TPS game, an FPS game, and a MOBA game.

The first-perspective picture is a picture of a virtual environment observed from a first perspective of a virtual object in the virtual environment. Optionally, the first perspective is a perspective of observing the virtual environment by using a first-person perspective of a virtual character. Alternatively, the first perspective is a perspective of observing the virtual environment by using a third-person perspective of a virtual character.

A building joystick control corresponding to a target building is further superimposed and displayed on the first-perspective picture. The building joystick control is a joystick control used for constructing the target building, and the building joystick control is also used for controlling rotation of a perspective of the virtual object in the virtual environment, so as to determine a target construction position of the target building. For example, an object construction controller, such as the building joystick control, corresponding to the target object is displayed.

Figure 4:
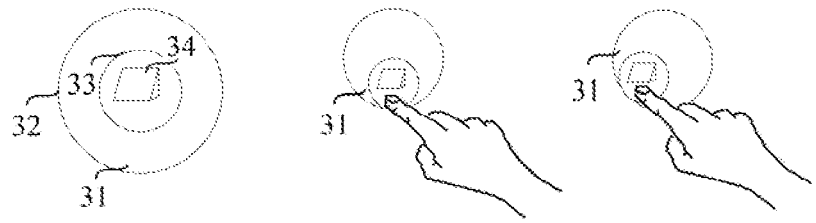
FIG. 4 is a schematic diagram of a display interface of a building joystick control displayed in a virtual environment picture according to an exemplary embodiment of this application.

For example, FIG. 4 shows a building joystick control 31. As shown in the left figure, the building joystick control 31 includes an outer circle 32 and a button 33, and a graphic of a target building 34 is displayed on the button 33. The building joystick control 31 is displayed on a virtual picture of the application of the terminal. When a user triggers a touch operation on the button 33 of the building joystick control 31, the terminal constructs the target building 34 in the virtual environment. The user can also drag the touch operation to adjust the target construction position of the target building. The user can drag the button 33 in any direction in the outer circle 32 to adjust the target construction position. As shown in the middle figure, the user drags the button 33 downward in the outer circle 32. As shown in the right figure, the user drags the button 33 to the lower left in the outer circle 32.

Optionally, the target building includes at least one of a virtual wall, a virtual roof, virtual stairs, and a virtual floor.

In step 202, a touch operation triggered on the building joystick control is received. For example, a touch operation on the object construction controller is received.

The terminal includes a touch screen, and the touch operation triggered by the user is received in a screen area corresponding to the building joystick control. The touch operation is used for determining the target construction position of the target building. The touch operation is an operation that the user touches the screen and holds.

In step 203: a position at a target distance in a first observation direction in which a first perspective is located as a target construction position of a target building is determined based on the touch operation. For example, a target construction position of the target object is determined based on the touch operation, a target distance, and the first observation direction of the virtual movable object.

Optionally, a target distance is set in the application, and the target distance indicates a distance between the target construction position and the virtual object when the target building is constructed in the virtual environment.

The first observation direction in which the first perspective is located coincides with a direction in which an aim point position of the first perspective is located. The terminal determines, based on the touch operation, a position at the target distance in the first observation direction in which the first perspective is located as the target construction position of the target building. That is, the target construction position is in the direction in which the aim point position of the first perspective is located.

Optionally, the target distance is a distance between a position of the virtual character determined by the terminal and the target construction position. The target construction position is an intersection of a straight line extending in the first observation direction and an object in the virtual environment.

In step 204, a touch release operation corresponding to the touch operation is received.

The touch release operation is a release operation that the user moves the hand away from the screen after triggering the touch operation on the touch screen. The touch release operation corresponding to the touch operation is used for constructing the target building at the target construction position.

In step 205, the target building is constructed at the target construction position according to the touch release operation. For example, the target object is constructed at the determined target construction position according to the touch release operation.

The terminal constructs the target building at the target construction position according to the touch release operation corresponding to the touch operation. That is, after the user adjusts the target construction position and releases the hand, one target building is automatically constructed on the target construction position.

Optionally, the terminal constructs the target building at the target construction position according to the touch release operation in response to the fact that no object affecting the construction exists at the target construction position.

In summary, this embodiment provides a method for constructing a building in a virtual environment. A first-perspective picture of an application is displayed, and a building joystick control corresponding to a target building is superimposed and displayed on the first-perspective picture. A touch operation triggered on the building joystick control is received. A position at a target distance in a first observation direction in which a first perspective is located is determined, based on the touch operation, as a target construction position of the target building. A touch release operation corresponding to the touch operation is received. The target building is constructed at the target construction position according to the touch release operation. In the foregoing target building construction process, a user completes, through the building joystick control corresponding to the target building, one touch and release operation to complete the construction of the target building at an aim point position of the first perspective, thereby implementing the fast and efficient construction of the target building in the virtual environment of the application; compared with conventional target building construction that requires three steps, the foregoing construction process reduces two steps and improves the human-computer interaction efficiency.

Figure 5:
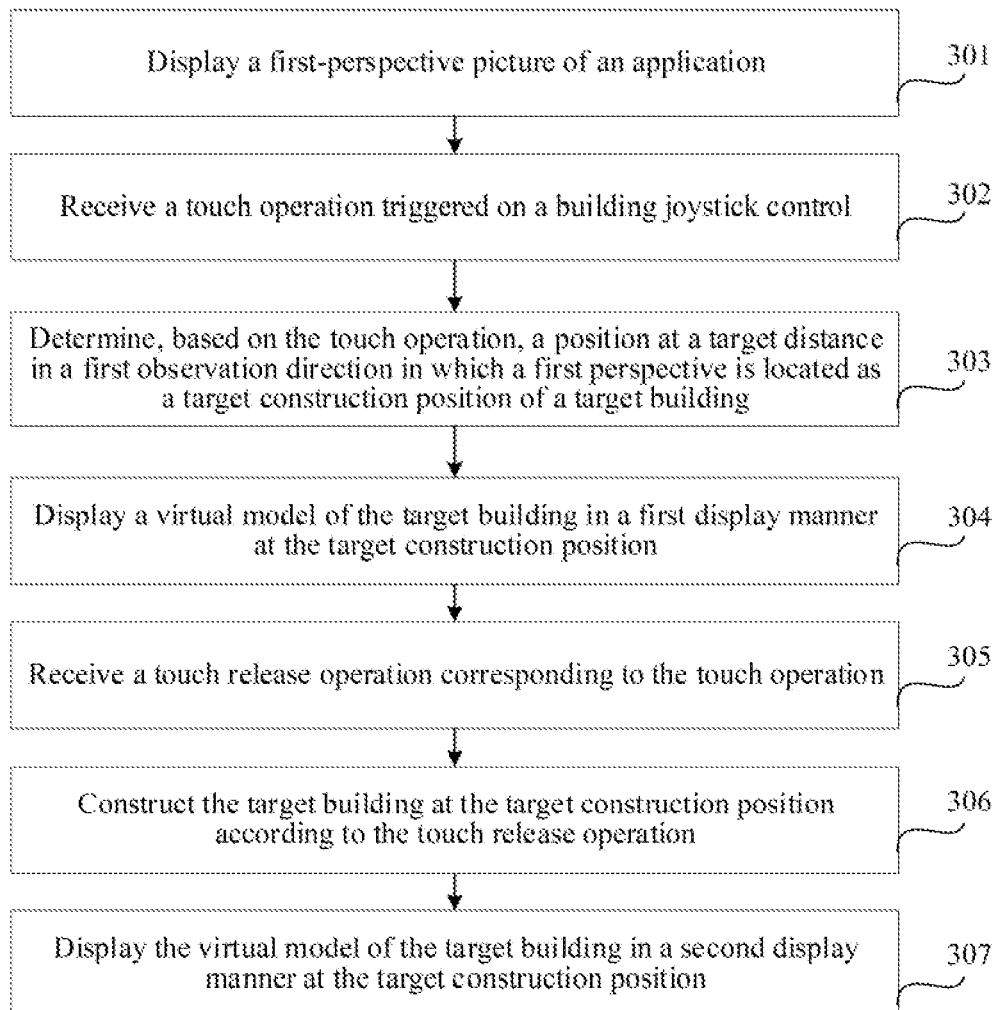
FIG. 5 is a flowchart of a method for constructing a building in a virtual environment according to another exemplary embodiment of this application.

In the building construction process, the terminal displays the target building in the virtual environment. A display manner of the target building includes a first display manner and a second display manner. In some embodiments, after determining the target construction position of the target building, the terminal displays the target building in the first display manner, and after constructing the target building at the target construction position, the terminal displays the target building in the second display manner. For example, FIG. 5 is a flowchart of a method for constructing an object, such as a building, in a virtual environment, where the terminal applies the two display manners. The method is applied to the terminal and includes the following steps.

In step 301, a first-perspective picture of an application is displayed.

The first-perspective picture is a picture or image of a virtual environment observed from a first perspective of a virtual object in the virtual environment. Optionally, the first perspective is a perspective of observing the virtual environment from a first-person perspective of the virtual object in the virtual environment. Alternatively, the first perspective is a perspective of observing the virtual environment from a third-person perspective of the virtual object in the virtual environment.

A building joystick control corresponding to a target building is superimposed and displayed on the first-perspective picture.

In step 302, a touch operation triggered on a building joystick control is received.

A touch screen is mounted on the terminal, and the terminal receives the touch operation triggered in a screen area corresponding to the building joystick control. The touch operation is a touch operation of touching the screen and holding.

In step 303, a position at a target distance in a first observation direction in which a first perspective is located as a target construction position of a target building is determined based on the touch operation.

The touch operation indicates a construction start event of the target building. The terminal starts to construct the target building according to the touch operation. First, the terminal determines a position at a target distance in a first observation direction in which the first perspective is located as a target construction position of the target building.

The first observation direction in which the first perspective is located is a direction that an aim point position of the first perspective points to. The target distance indicates a spatial distance between the direction that the virtual object points to along the aim point position and the target construction position in the virtual environment.

In step 304, a virtual model of the target building is displayed in a first display manner at the target construction position.

After determining the target construction position, the terminal displays the virtual model of the target building in the first display manner at the target construction position.

Optionally, the first display manner is a manner of displaying a sketch of the target building, where the sketch is a contour map of the target building. Alternatively, the first display manner is a manner of displaying the target building translucently. Optionally, a space volume of the sketch of the target building or the translucent target building shown in the virtual environment is the same as a space volume occupied by a completed target building in the virtual environment. The sketch of the target building or the translucent target building displayed at the target construction position is equivalent to a construction plan of the target building, rather than the construction completed at the target construction position in the virtual environment.

Optionally, the terminal displays the virtual model of the target building in the first display manner at the target construction position in response to the fact that no object affecting the construction exists at the target construction position. That is, when determining that no object affecting the construction exists at the target construction position, the terminal displays the virtual model of the target building in the first display manner at the target construction position. For example, the target building is a virtual floor. When the terminal determines that a stone is set at the target construction position in the virtual environment, the terminal refuses to construct the virtual floor at the target construction position and refuses to display the virtual model of the target building. When the target construction position in the virtual environment is a smooth ground, the terminal displays the virtual model of the target building in the first display manner at the target construction position.

In step 305, a touch release operation corresponding to the touch operation is received.

The touch release operation is an operation that the user touches and moves the hand away from the screen, and corresponds to the touch operation.

In step 306, the target building is constructed at the target construction position according to the touch release operation.

The terminal constructs the target building at the target construction position according to the touch release operation.

In step 307, the virtual model of the target building is displayed in a second display manner at the target construction position.

The terminal displays the virtual model of the target building in the second display manner at the target construction position.

The second display manner is a manner that the target building is completely displayed in the virtual environment. The target building displayed in the second display manner is equivalent to a building that actually exists in the virtual environment. For example, the target building is virtual stairs. The virtual stairs are displayed in the second display manner at the target construction position, and the virtual object can climb upward by using the stairs.

Figure 6:
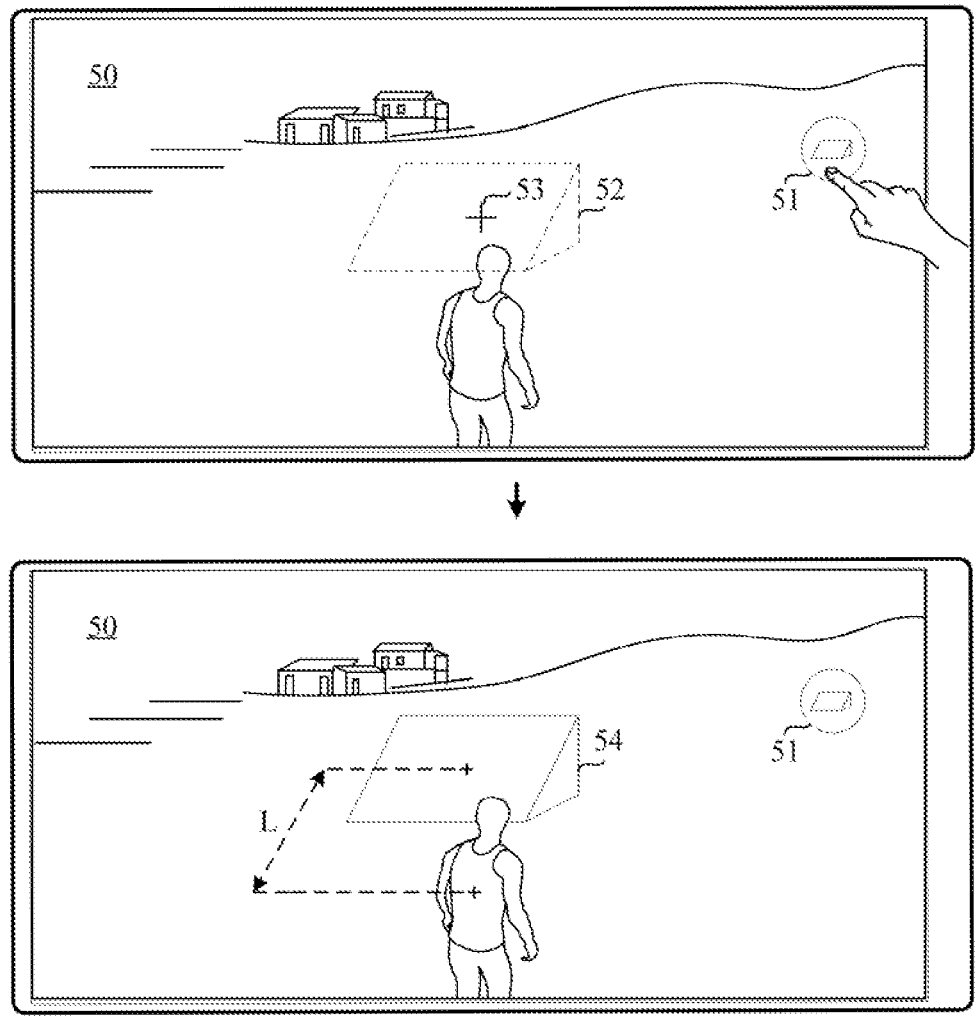
FIG. 6 is a schematic diagram of a display interface for constructing a building in a virtual environment according to an exemplary embodiment of this application.

For example, referring to FIG. 6, a first-perspective picture 50 of an application is displayed on a terminal. A building joystick control 51 is superimposed and displayed on the first-perspective picture 50, and a target building is displayed on the building joystick control 51. The terminal receives a touch operation triggered on the building joystick control 51, and displays the target building in a first display manner on a first display interface. As shown in a sketch 52 of the target building in the figure, shown with dashed lines for example, a target construction position of the sketch 52 of the target building is located at an aim point position 53 of a first perspective. The terminal receives a touch release operation corresponding to the touch operation, and displays a completed target building 54 in a second display manner on the first display interface. The target construction position is located at a target distance L in a first observation direction in which the first perspective is located.

In summary, this embodiment provides a method for constructing a building in a virtual environment. A first-perspective picture of an application is displayed, and a building joystick control corresponding to a target building is superimposed and displayed on the first-perspective picture. A touch operation triggered on the building joystick control is received. A position at a target distance in a first observation direction in which a first perspective is located is determined, based on the touch operation, as a target construction position of the target building. A touch release operation corresponding to the touch operation is received. The target building is constructed at the target construction position according to the touch release operation. In the foregoing target building construction process, a user completes, through the building joystick control corresponding to the target building, one touch and release operation to complete the construction of the target building at an aim point position of the first perspective, thereby implementing the fast and efficient construction of the target building in the virtual environment of the application; compared with related target building construction that requires three steps, the foregoing construction process reduces two steps and improves the human-computer interaction efficiency.

Figure 7:
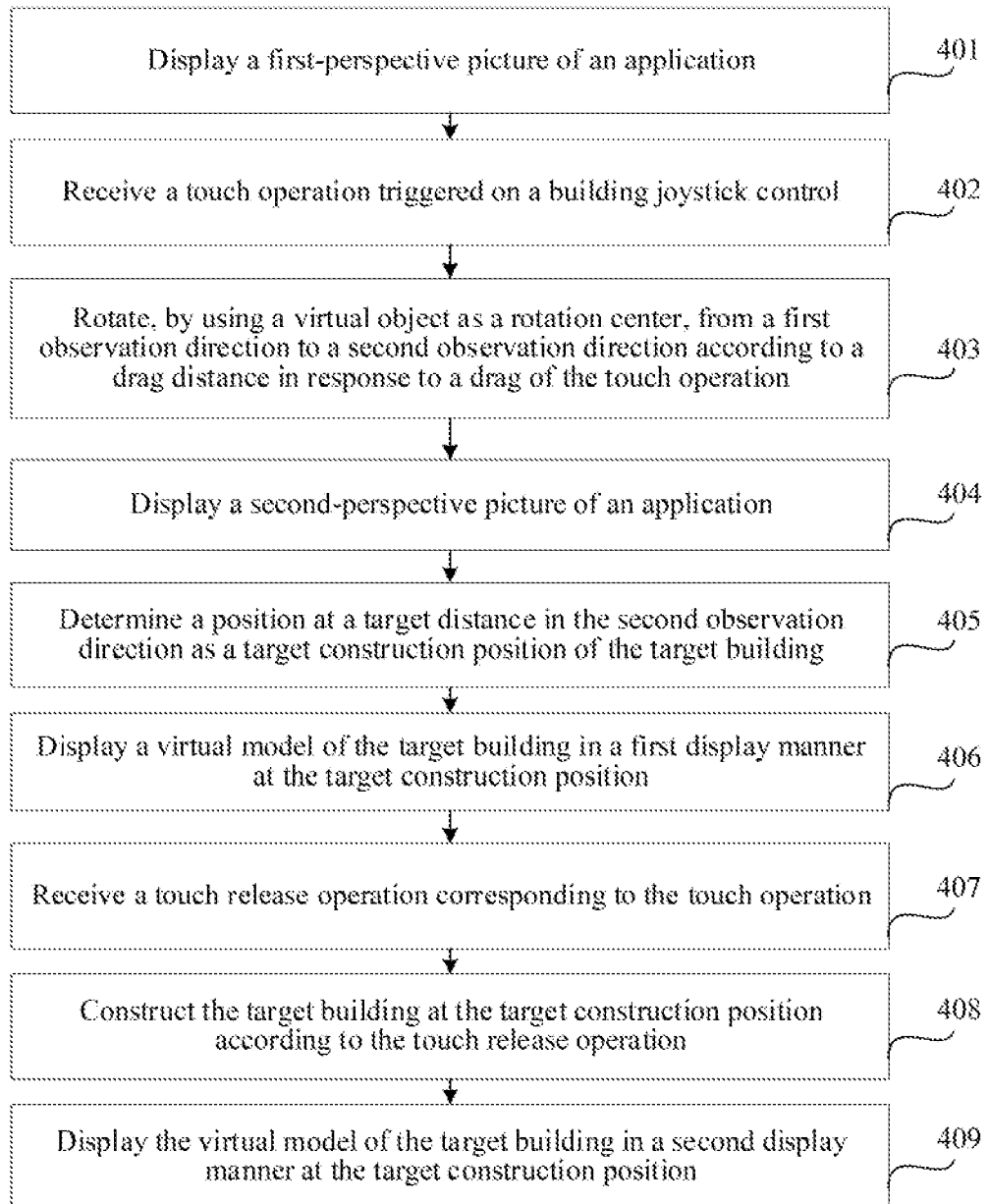
FIG. 7 is a flowchart of a method for constructing a building in a virtual environment according to another exemplary embodiment of this application.

In a process of constructing a building in a virtual environment, a user can also adjust a target construction position through a building joystick control. FIG. 7 is a flowchart of a method for constructing an object, such as a building, in a virtual environment according to an exemplary embodiment of this application, to describe a method for adjusting the target construction position. The method is applied to a terminal and includes the following steps.

In step 401, a first-perspective picture of an application is displayed.

For an exemplary description, refer to step 301. Details are not described herein again.

In step 402, a touch operation triggered on the building joystick control is received.

For an exemplary description, refer to step 302. Details are not described herein again.

In step 403, rotation is performed, by using a virtual object as a rotation center, from a first observation direction to a second observation direction according to a drag distance in response to a drag of the touch operation.

A touch operation is triggered on a displayed building joystick control, and is dragged on the building joystick control; and an observation direction in which a perspective of the virtual object is located is adjusted according to the drag of the touch operation.

The user drags a touch position on the building joystick control around 360 degrees to rotate an observation direction in which the perspective of the virtual object in a horizontal direction and a vertical direction is located. The terminal obtains, according to a drag distance, a rotation angle of the observation direction in which the perspective is located. By using the first observation direction as a reference and the virtual object as a rotation center, the terminal rotates by the obtained rotation angle of the observation direction towards the drag direction, to obtain a second perspective.

For example, the rotation angle of the observation direction is in positive correlation with the drag distance, that is, a greater drag distance indicates a greater rotation angle of the observation direction. For example, the positive correlation between the rotation angle of the observation direction and the drag distance may alternatively be expressed by using a linear formula.

In step 404, a second-perspective picture of the application is displayed.

The second-perspective picture is a picture or image of a virtual environment observed from a second perspective of a virtual object in the virtual environment. Optionally, the second perspective is a perspective of observing the virtual environment from a first-person perspective of the virtual object in the virtual environment. Alternatively, the second perspective is a perspective of observing the virtual environment from a third-person perspective of the virtual object in the virtual environment.

In step 405, a position at a target distance in the second observation direction as the target construction position of the target building is determined.

Referring to step 303, for example, the method for determining the target construction position in the second-perspective picture is the same as the method for determining the target construction position in the first-perspective picture. Details are not described herein again.

In step 406, a virtual model of the target building is displayed in a first display manner at the target construction position.

For an exemplary description, refer to step 304. Details are not described herein again.

In step 407, a touch release operation corresponding to the touch operation is received.

For an exemplary description, refer to step 305. Details are not described herein again.

In step 408, the target building at the target construction position is constructed according to the touch release operation.

For an exemplary description, refer to step 306. Details are not described herein again.

In step 409, the virtual model of the target building is displayed in a second display manner at the target construction position.

For an exemplary description, refer to step 307. Details are not described herein again.

Figure 8:
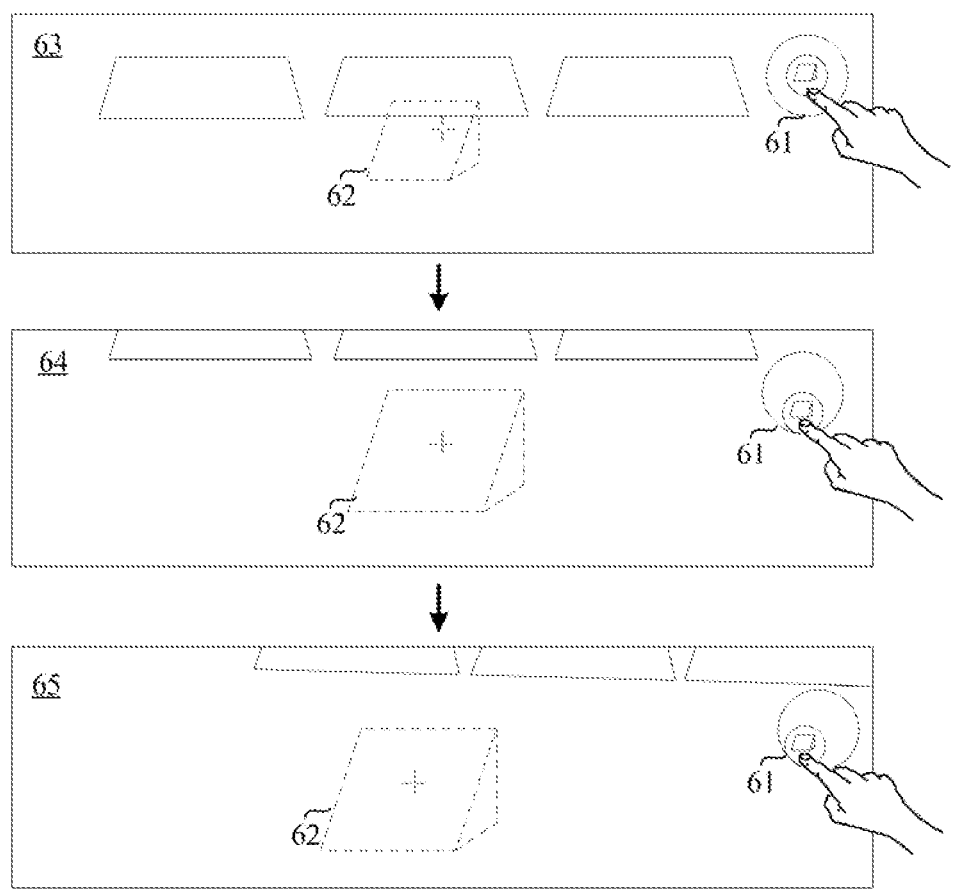
FIG. 8 is a schematic diagram of a display interface for constructing a building in a virtual environment according to another exemplary embodiment of this application.

For example, referring to FIG. 8, the terminal displays a first-perspective picture 63, and receives a touch operation on a building joystick control 61. A target building 62 is displayed in the first-perspective picture 63. When the touch operation is dragged downward, a first observation direction is rotated to a second observation direction. The terminal displays a second-perspective picture 64, and the target building 62 is displayed in the second-perspective picture 64; and when the touch operation is further dragged to the lower left, the second observation direction is rotated to a third observation direction. The terminal displays a third-perspective picture 65, and the target building 62 is displayed in the third-perspective picture 65. Since the touch release operation is not triggered in the picture shown in FIG. 8, the target buildings 62 are all displayed in the first display manner.

In summary, this embodiment provides a method for constructing a building in a virtual environment. A first-perspective picture of an application is displayed, and a building joystick control corresponding to a target building is superimposed and displayed on the first-perspective picture. A touch operation triggered on the building joystick control is received. A position at a target distance in a first observation direction in which a first perspective is located is determined, based on the touch operation, as a target construction position of the target building. A touch release operation corresponding to the touch operation is received. The target building is constructed at the target construction position according to the touch release operation. In the foregoing target building construction process, a user completes, through the building joystick control corresponding to the target building, one touch and release operation to complete the construction of the target building at an aim point position of the first perspective, thereby implementing the fast and efficient construction of the target building in the virtual environment of the application; compared with related target building construction that requires three steps, the foregoing construction process reduces two steps and improves the human-computer interaction efficiency.

According to the method for constructing a building in a virtual environment provided in this embodiment, the target construction position is further adjusted while the perspective is adjusted; the adjustment of the perspective and the adjustment of the target construction position are combined into one step, thereby improving the operation efficiency of the user, making the building construction more flexible, and improving user experience.

Figure 9:
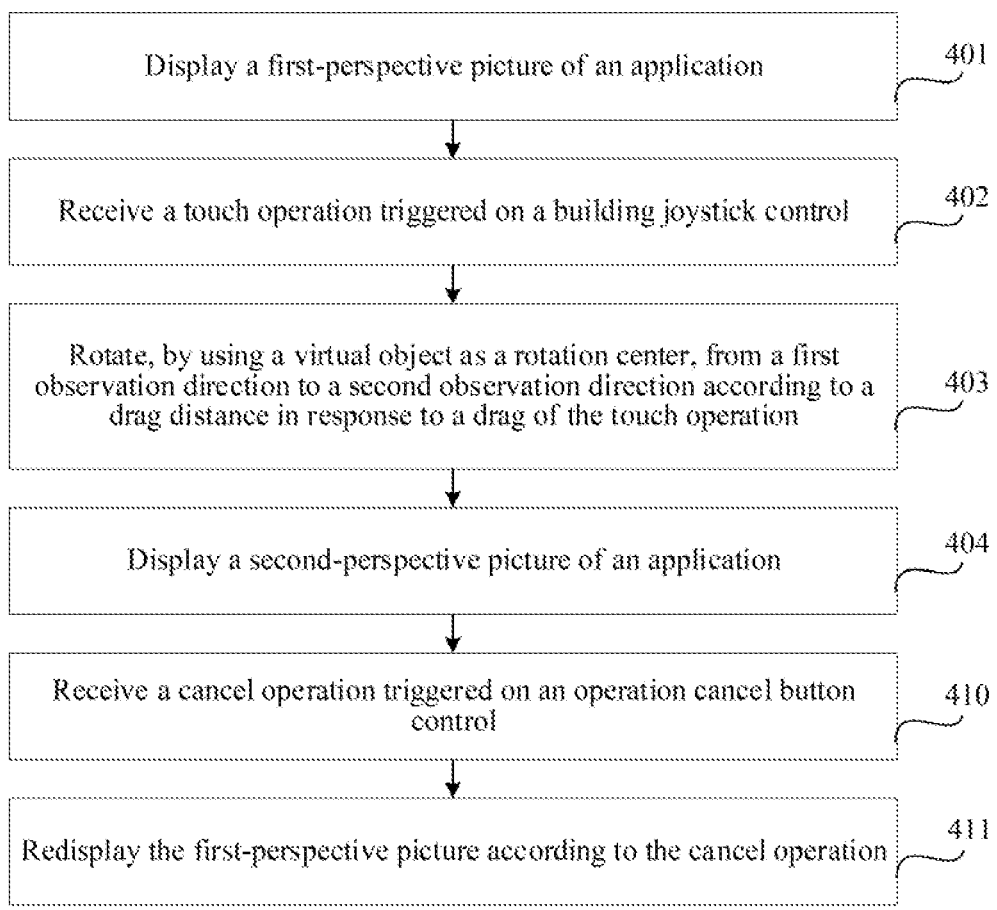
FIG. 9 is a flowchart of a method for constructing a building in a virtual environment according to another exemplary embodiment of this application.

An operation cancel button control is further superimposed and displayed on a second-perspective picture. In an intermediate process of constructing the building, the terminal can interrupt the construction of the building. As shown in FIG. 9, step 405 to step 409 are replaced with step 410 and step 411, to describe a method for canceling the building construction by the terminal in the intermediate process of constructing the building. The method includes the following steps.

In step 410, a cancel operation triggered on an operation cancel button control is received.

The terminal receives the cancel operation triggered on a screen area corresponding to the operation cancel button control, for example, a click operation triggered on the operation cancel button control.

In step 411, the first-perspective picture is redisplayed according to the cancel operation.

The terminal cancels construction of the target building, and redisplays the first-perspective picture according to the cancel operation.

Figure 10:
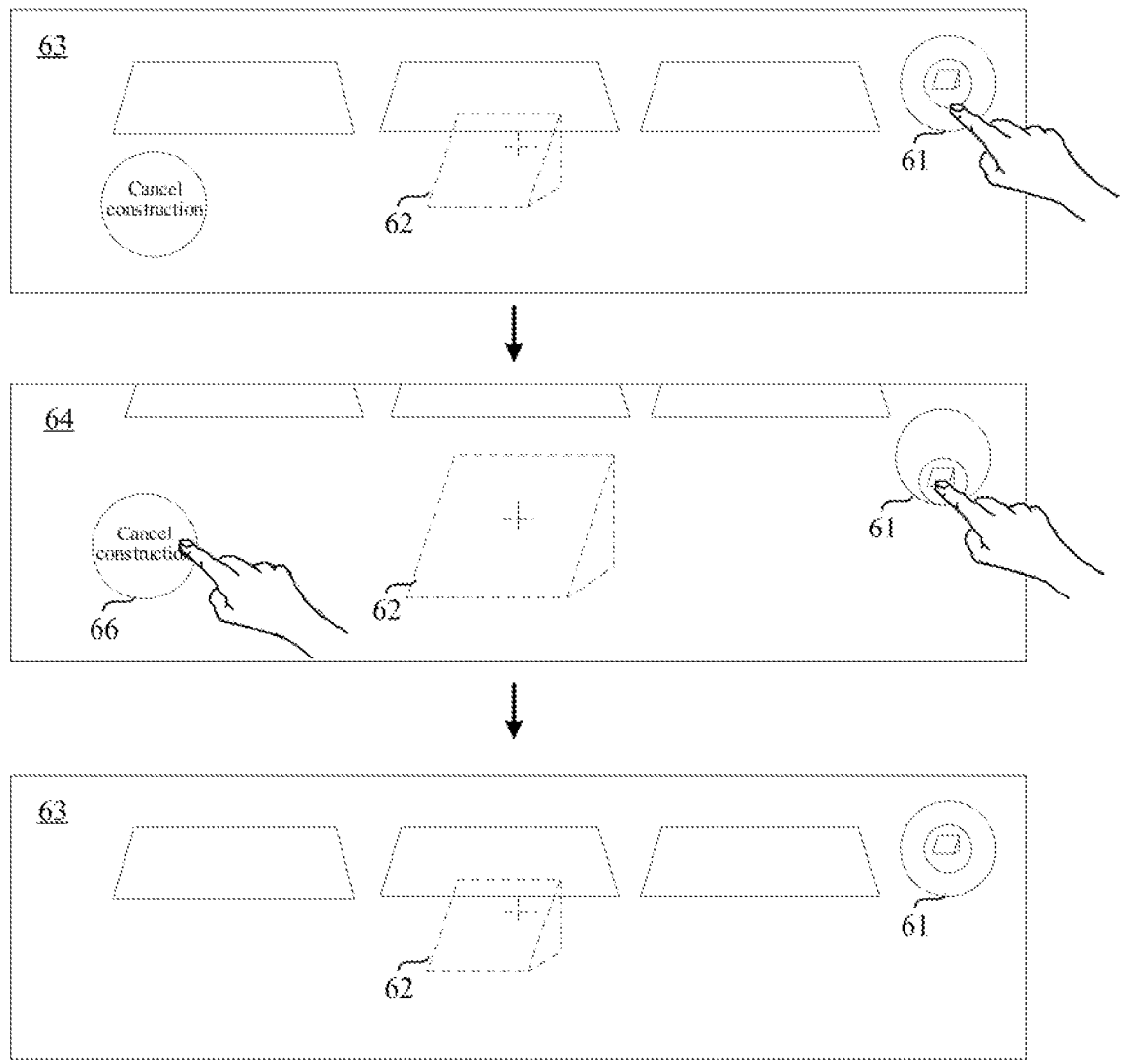
FIG. 10 is a schematic diagram of a display interface for constructing a building in a virtual environment according to another exemplary embodiment of this application.

For example, as shown in FIG. 10, the terminal displays a first-perspective picture 63, and receives a touch operation on a building joystick control 61. A target building 62 is displayed in the first-perspective picture 63. When the touch operation is dragged downward, a first perspective is rotated to a second perspective. The terminal displays a second-perspective picture 64, and the target building 62 is displayed in the second-perspective picture 64. An operation cancel button control "cancel construction" 66 can be superimposed and displayed on the second-perspective picture 64. The terminal receives a cancel operation triggered on the operation cancel button control "cancel construction" 66, cancels the construction of the target building, and redisplays the first-perspective picture 63.

In summary, according to the method for constructing a building in a virtual environment provided in this embodiment, building construction can be interrupted in an intermediate process of constructing the building, and when a user performs a wrong operation, the operation can be interrupted in time, thereby improving user experience.

Figure 11:
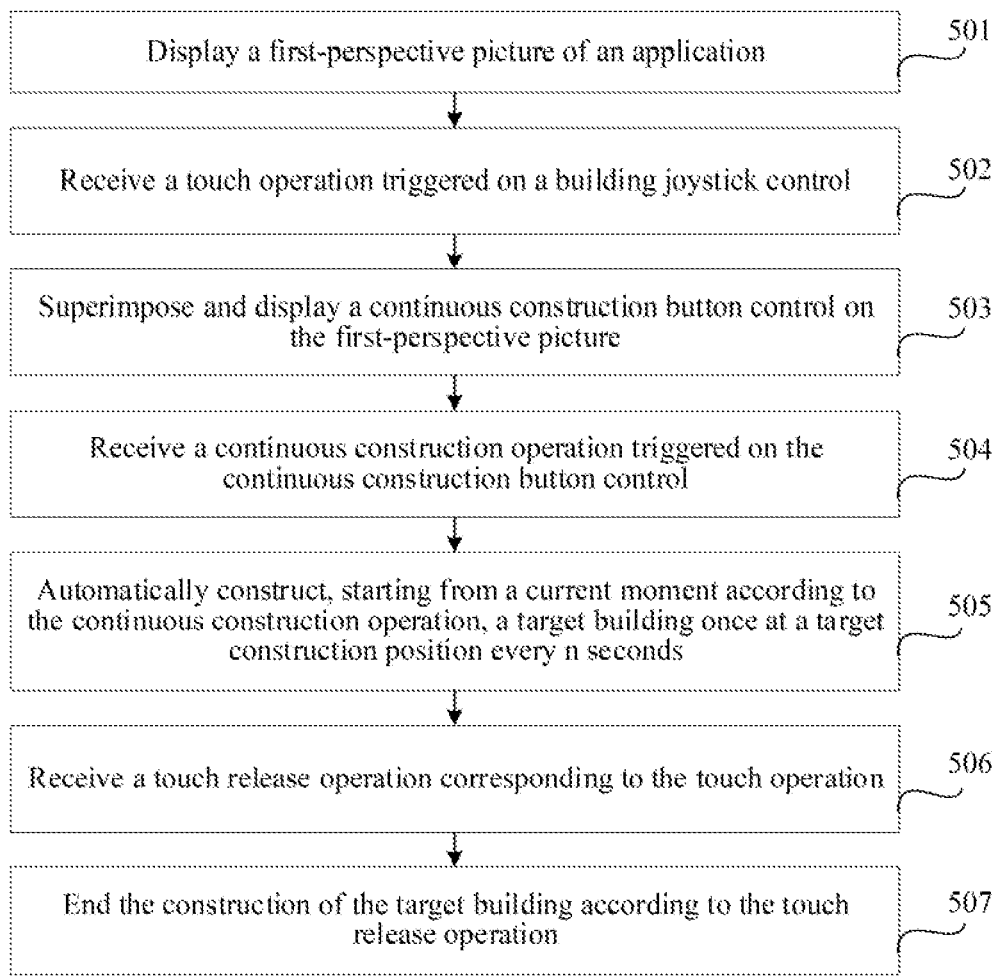
FIG. 11 is a flowchart of a method for constructing a building in a virtual environment according to another exemplary embodiment of this application.

FIG. 11 is a flowchart of a method for constructing an object, such as a building, in a virtual environment according to another exemplary embodiment of this application. The method may further enable a terminal to continuously construct buildings and is applied to a terminal. The method includes the following steps.

In step 501, a first-perspective picture of an application is displayed.

For an exemplary description, refer to step 301. Details are not described herein again.

In step 502, a touch operation triggered on a building joystick control is received.

For an exemplary description, refer to step 302. Details are not described herein again.

In step 503, a continuous construction button control is superimposed and displayed on the first-perspective picture.

The terminal superimposes and displays the continuous construction button control on the first-perspective picture according to the touch operation. The continuous construction button control is used for continuously and automatically constructing target buildings.

In step 504, a continuous construction operation triggered on the continuous construction button control is received.

The terminal receives the continuous construction operation triggered on the continuous construction button control.

In step 505, starting from a current moment according to the continuous construction operation, a target building is automatically constructed once at a target construction position every n seconds.

Starting from the triggering of the continuous construction operation, the terminal determines a moment after an interval of n seconds as a first moment; a moment after an interval of n seconds from the first moment is determined as a second moment; a moment after an interval of n seconds from the second moment is determined as a third moment; and the remaining may be deduced by analogy. The terminal determines an $i^{th}$ moment every n seconds, i being a positive integer. At the $i^{th}$ moment, the terminal automatically constructs the target building once at the target construction position.

Optionally, the terminal re-determines, within an interval of n seconds, the target construction position according to a drag operation in response to a drag of the touch operation; and automatically constructs the target building once at the re-determined target construction position every n seconds.

There is an interval of n seconds between two consecutive moments at which the terminal constructs the target buildings. Within the interval of n seconds, the user can drag the touch operation, and change, by dragging the touch operation, an observation direction in which a perspective of a virtual object in the virtual environment is located, thereby determining a new perspective picture, and determining a target construction position in the new perspective picture. At the latter moment of the two moments with the interval of n seconds, the terminal automatically constructs the target building once at the re-determined target construction position.

In step 506, a touch release operation corresponding to the touch operation is received.

The terminal receives the touch release operation corresponding to the touch operation.

In step 507, the construction of the target building is ended according to the touch release operation.

When the user maintains the touch operation, the terminal continuously constructs the target buildings, and when the terminal receives the touch release operation corresponding to the touch operation, the terminal ends the construction of the target buildings.

Figure 12:
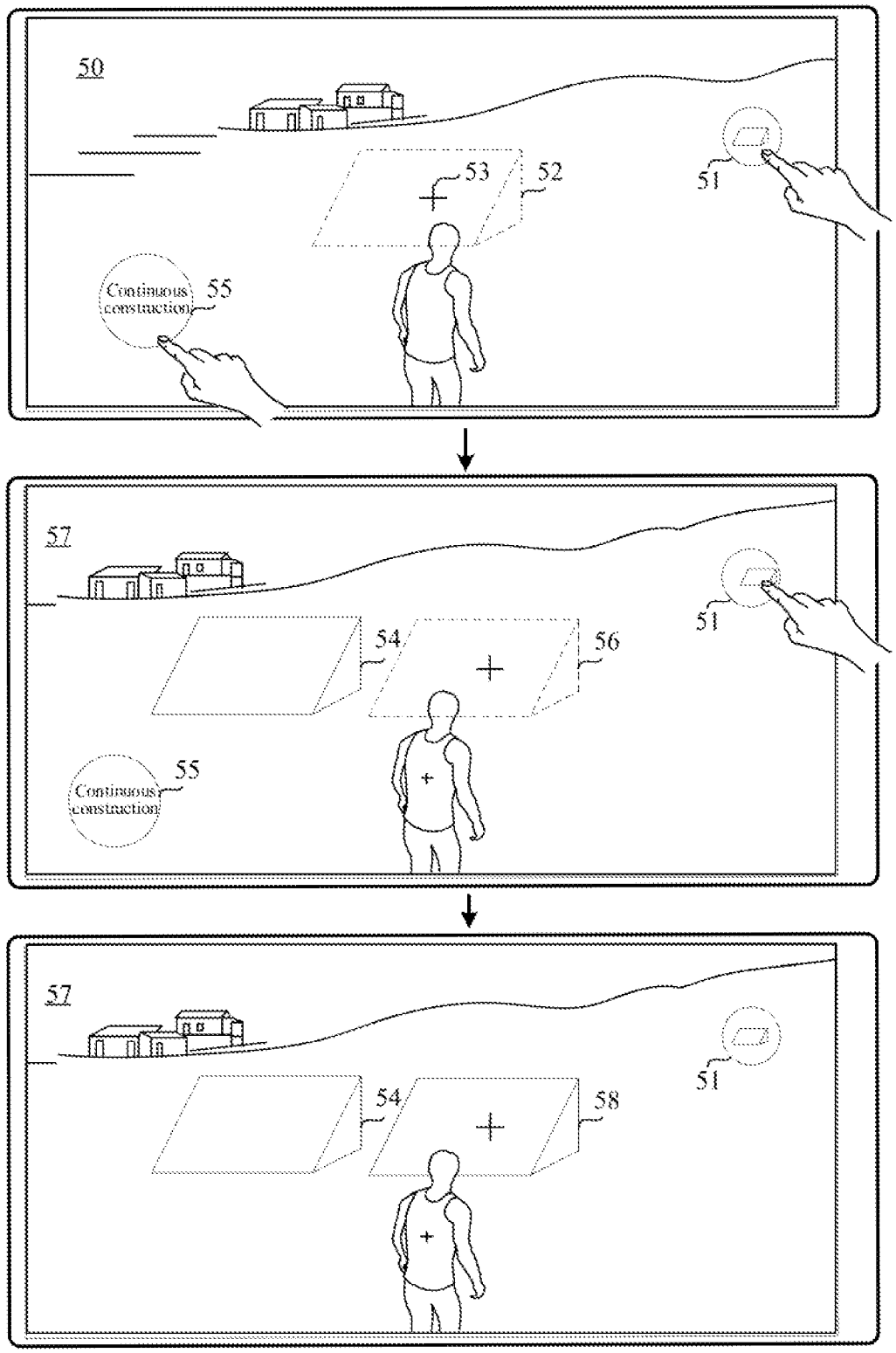
FIG. 12 is a schematic diagram of a display interface for constructing a building in a virtual environment according to another exemplary embodiment of this application.

For example, as shown in FIG. 12, a first-perspective picture 50 is displayed on a terminal. When a touch operation is received on a building joystick control 51, a continuous construction button control 55 is superimposed and displayed on the first-perspective picture 50, and a target building 52 is displayed in a first display manner. At a first moment, the terminal displays a target building 54 displayed in a second display manner corresponding to the target building 52. The terminal receives a continuous construction operation of the continuous construction button control 55. In an interval between the first moment and a second moment, a user rotates, through the building joystick control 51, a first observation direction in which a perspective is located to a second observation direction. The terminal displays a second-perspective picture 57, and the second-perspective picture 57 displays a target building 56 displayed in the first display manner. At the second moment, the terminal displays, in the second-perspective picture 57, a target building 58 displayed in the second display manner corresponding to the target building 56. The terminal receives a touch release operation corresponding to the touch operation, and ends the automatic construction of the target buildings.

In summary, this embodiment provides a method for constructing a building in a virtual environment. A target construction position is adjusted while a perspective is adjusted; the adjustment of the perspective and the adjustment of the target construction position are combined into one step, thereby improving the operation efficiency of a user, making the building construction more flexible, and improving user experience.

Repeated steps for repeatedly constructing the same buildings are omitted through automatic and continuous building construction, thereby improving the human-computer interaction.

Figure 13:
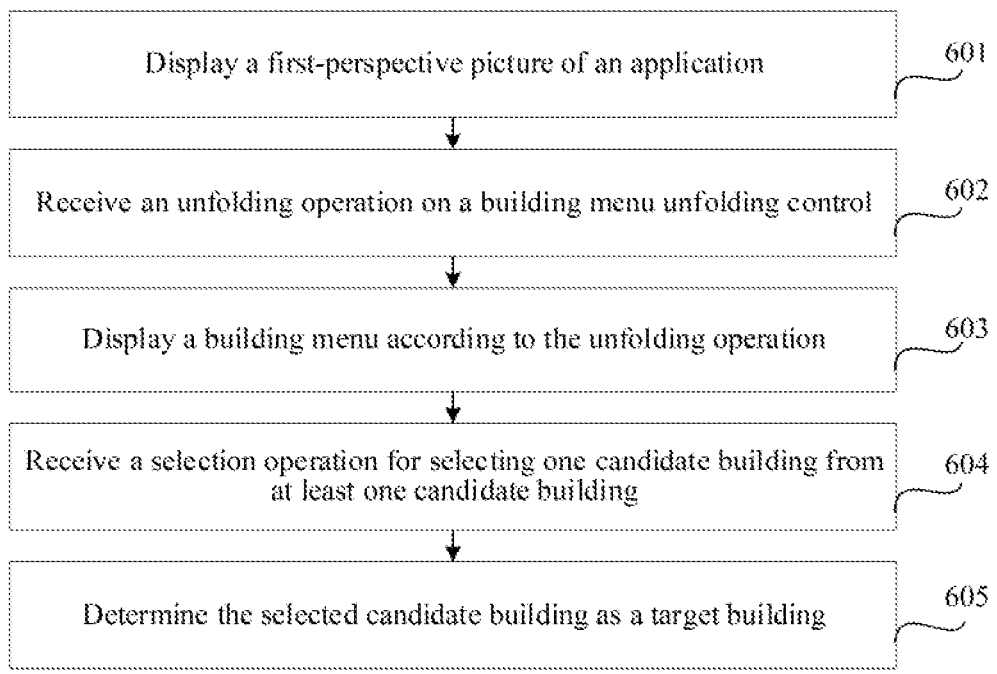
FIG. 13 is a flowchart of a method for constructing a building in a virtual environment according to another exemplary embodiment of this application.

In some embodiments, a user can customize the target building corresponding to the building joystick control. FIG. 13 is a flowchart of a method for constructing an object, such as a building, in a virtual environment according to another exemplary embodiment of this application. The method is applied to a terminal and includes the following steps.

In step 601, a first-perspective picture of an application is displayed.

For an exemplary description, refer to step 301. Details are not described herein again.

In step 602, an unfolding operation on a building menu unfolding control is received.

The terminal receives the unfolding operation on the building menu unfolding control, and the unfolding operation is used for superimposing and displaying a building menu on a first-perspective picture.

In step 603, a building menu is displayed according to the unfolding operation.

The terminal superimposes and displays the building menu on the first-perspective picture according to the unfolding operation, and the building menu includes at least one candidate building (or candidate building object). Optionally, the candidate building includes at least one of virtual stairs, a virtual wall, a virtual roof, and a virtual floor.

In step 604, a selection operation is received for selecting one candidate building from the at least one candidate building.

In step 605, the selected candidate building is determined as a target building.

The terminal determines the selected candidate building as the target building according to the selection operation.

Figure 14:
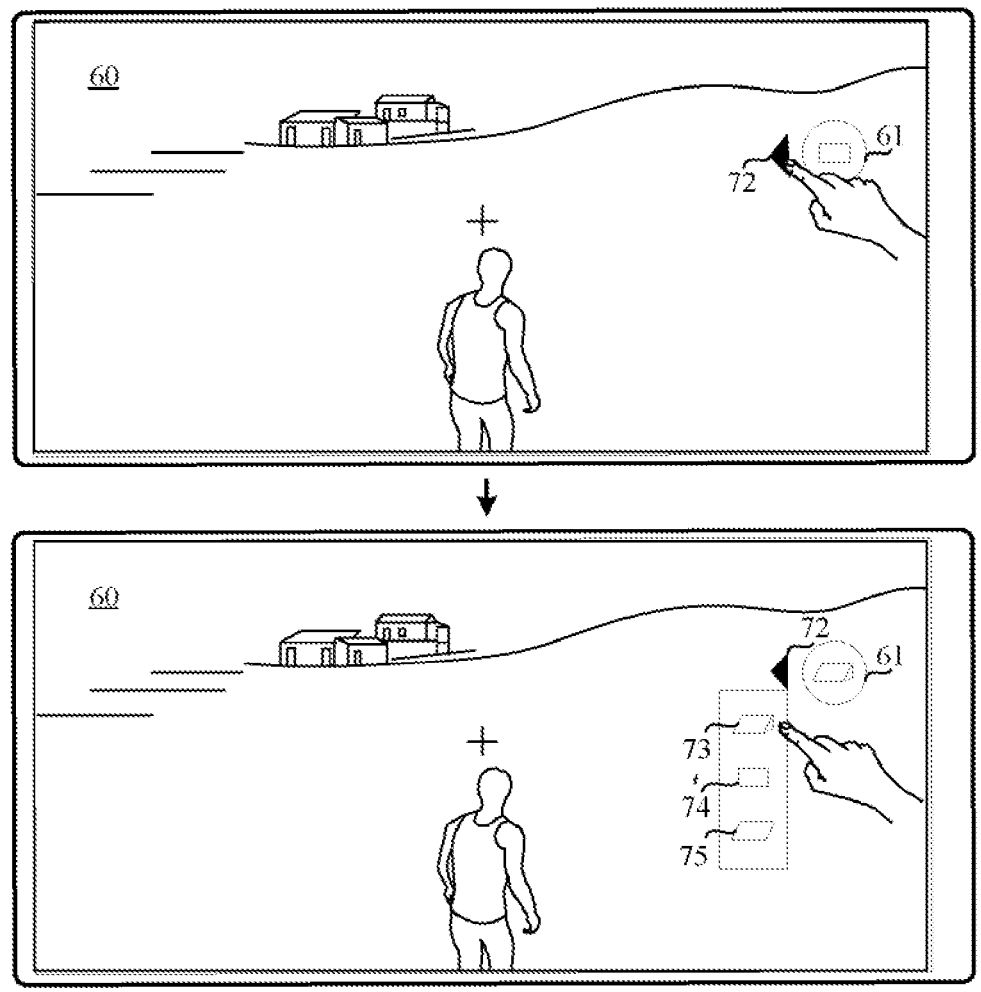
FIG. 14 is a schematic diagram of a display interface for constructing a building in a virtual environment according to another exemplary embodiment of this application.

For example, as shown in FIG. 14, a building joystick button control 61 corresponding to a target building and a building menu unfolding control 72 are superimposed and displayed on a first-perspective picture 60. An icon of a candidate building 64 is correspondingly displayed on the building joystick button control 61, that is, the candidate building 64 is the target building in this case. An unfolding operation on the building menu unfolding control 72 is received, a display box of the candidate building is displayed, and a candidate building 73, the candidate building 74, and a candidate building 75 are displayed in the display box. A selection operation on a control corresponding to the candidate building 63 is received, and the candidate building 63 is determined as the target building. In this case, an icon of the candidate building 63 is correspondingly displayed on the building joystick button control 61.

In summary, this embodiment provides a method for constructing a building in a virtual environment. A target building is customized and a type of a building that is constructed quickly is selected, which is applicable to different application scenarios, thereby improving the operation experience of a user.

Figure 15:
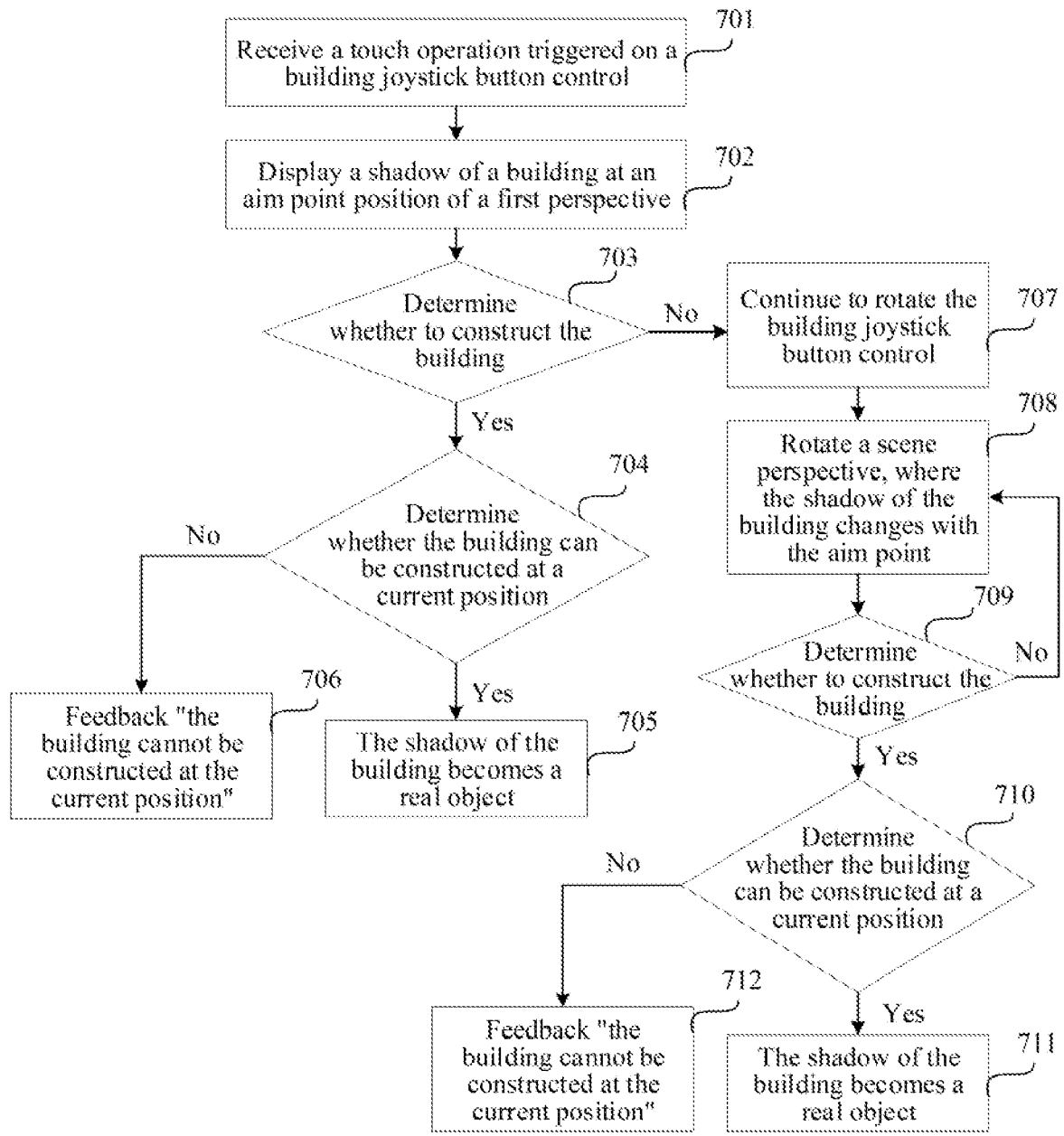
FIG. 15 is a flowchart of a method for constructing a building in a virtual environment according to another exemplary embodiment of this application.

FIG. 15 is a flowchart of a method for constructing an object, such as a building, in a virtual environment according to another exemplary embodiment of this application. The method is applied to a terminal and includes the following steps:

In step 701, a touch operation triggered on a building joystick button control is received.

The terminal displays a first-perspective picture of an application, and a building joystick button control corresponding to a target building is superimposed and displayed on the first-perspective picture. The terminal receives the touch operation triggered on the building joystick button control.

In step 702, a shadow of a building at an aim point position of a first perspective is displayed.

The terminal displays the shadow of the target building at the aim point position of the first perspective according to the touch operation.

In step 703, a determination is made as to whether to construct the building.

The terminal determines whether to construct the target building. Optionally, when receiving a touch release operation corresponding to the touch operation, the terminal determines to construct the target building, and performs step 704; otherwise, the terminal performs step 707.

In step 704, a determination is made as to whether the building can be constructed at a current position.

The terminal determines whether the target building can be constructed at the aim point position of the current first perspective. When the target building cannot be constructed at the aim point position of the first perspective in the virtual environment, step 706 is performed; otherwise, step 705 is performed. The aim point position of the first perspective is an intersection of a direction in which the aim point is located and an object in the virtual environment.

In step 705, the shadow of the building becomes a real object.

When the foregoing determination result is positive, the target building is transformed from the shadow to a real object in the virtual environment, and the construction of the target building is completed.

In step 706, feedback such as "the building cannot be constructed at the current position" is provided.

When the target building cannot be constructed at the aim point position of the first perspective in the virtual environment, the terminal prompts "the building cannot be constructed at the current position". Optionally, the terminal superimposes and displays "the building cannot be constructed at the current position" on the first-perspective picture.

In step 707, rotation of the building joystick button control continues.

The user continues to rotate the building joystick button control to adjust the perspective of the virtual object.

In step 708, a scene perspective is rotated, where the shadow of the building changes with the aim point.

When the perspective of the virtual object changes, a scene in the virtual environment changes, and a corresponding perspective picture changes. The target building follows the change of the aim point position of the perspective picture. Optionally, the first-perspective picture displayed by the terminal is rotated to a second-perspective picture.

In step 709, a determination is made as to whether to construct the building.

For an exemplary description, refer to step 703. Details are not described herein again. When it is determined not to construct the building, the terminal returns to step 708.

In step 710, a determination is made as to whether the building can be constructed at a current position.

For an exemplary description, refer to step 704. Details are not described herein again.

In step 711, the shadow of the building becomes a real object.

For an exemplary description, refer to step 705. Details are not described herein again.

In step 712, feedback such as "the building cannot be constructed at the current position" is provided.

For the detailed description, refer to step 706. Details are not described herein again.

In summary, this embodiment provides a method for constructing a building in a virtual environment. A first-perspective picture of an application is displayed, and a building joystick control corresponding to a target building is superimposed and displayed on the first-perspective picture. A touch operation triggered on the building joystick control is received. A target construction position of the target building is determined according to the touch operation. A touch release operation corresponding to the touch operation is received. The target building is constructed at the target construction position according to the touch release operation. In the foregoing target building construction process, a user completes, through the building joystick control corresponding to the target building, one touch and release operation to complete the construction of the target building at an aim point position of the first perspective, thereby implementing the fast and efficient construction of the target building in the virtual environment of the application; compared with related target building construction that requires three steps, the foregoing construction process reduces two steps and improves the human-computer interaction efficiency.

Figure 16:
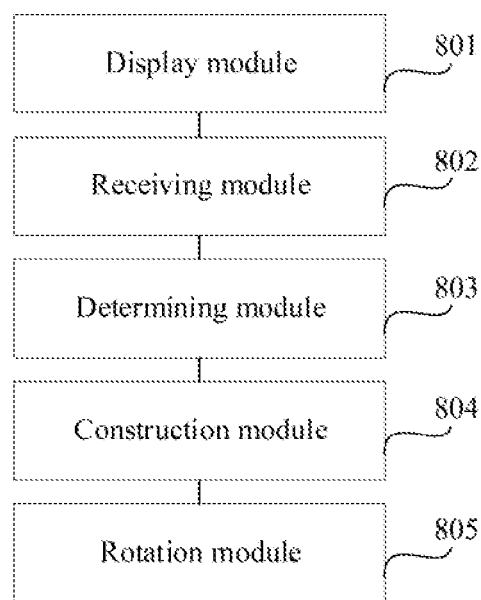
FIG. 16 is a block diagram of an apparatus for constructing a building in a virtual environment according to an exemplary embodiment of this application.

FIG. 16 is a block diagram of an apparatus for constructing an object, such as a building, in a virtual environment according to an exemplary embodiment of this application. The apparatus may implement all or a part of a terminal by using software, hardware, or a combination thereof. The apparatus can include a display module 801, a receiving module 802, a determining module 803, and a construction module 804. One or more modules of the apparatus can be implemented by processing circuitry, software, or a combination thereof, for example The display module 801 can be configured to display a first-perspective picture of an application, the first-perspective picture being a picture of a virtual environment observed from a first perspective of a virtual object in the virtual environment, a building joystick control corresponding to a target building being superimposed and displayed on the first-perspective picture. The receiving module 802 can be configured to receive a touch operation triggered on the building joystick control. The determining module 803 can be configured to determine, based on the touch operation, a position at a target distance in a first observation direction in which the first perspective is located as a target construction position of the target building. The receiving module 802 can be configured to receive a touch release operation corresponding to the touch operation. Further, the construction module 804 can be configured to construct the target building at the target construction position according to the touch release operation.

In some embodiments, the display module 801 is configured to, after the position at the target distance in the first observation direction in which the first perspective is located is determined as the target construction position of the target building based on the touch operation, display a virtual model of the target building in a first display manner at the target construction position; and after the target building is constructed at the target construction position according to the touch release operation, display the virtual model of the target building in a second display manner at the target construction position.

In some embodiments, the display module 801 is configured to display the virtual model of the target building in the first display manner at the target construction position in response to the fact that no object affecting the construction exists at the target construction position.

In some embodiments, the apparatus further includes a rotation module 805. The rotation module 85 is configured to rotate, by using a virtual object as a rotation center, the first observation direction to a second observation direction according to a drag distance in response to a drag of the touch operation. The display module 801 is configured to display a second-perspective picture of the application, the second-perspective picture being a picture of the virtual environment observed from a second perspective in the second observation direction in the virtual environment. The determining module 803 is configured to determine a position at a target distance in the second observation direction as the target construction position of the target building.

In some embodiments, an operation cancel button control is superimposed and displayed on the second-perspective picture. The receiving module 802 is configured to receive a cancel operation triggered on the operation cancel button control. Further, the display module 801 is configured to redisplay the first-perspective picture according to the cancel operation.

In some embodiments, the display module 801 is configured to superimpose and display a continuous construction button control on the first-perspective picture. The receiving module 802 is configured to receive a continuous construction operation triggered on the continuous construction button control. Further, the construction module 804 is configured to automatically construct, starting from a current moment according to the continuous construction operation, the target building once at the target construction position every n seconds.

In some embodiments, the determining module 803 is configured to re-determine, within an interval of n seconds, the target construction position according to a drag operation in response to the drag of the touch operation. Further, the construction module 804 is configured to automatically construct the target building once at the re-determined target construction position every n seconds.

In some embodiments, the receiving module 802 is configured to receive a touch release operation corresponding to the touch operation. Further, the construction module 804 is configured to end the construction of the target building according to the touch release operation.

In some embodiments, a building menu unfolding control is further superimposed and displayed on the first-perspective picture. The receiving module 802 is configured to receive an unfolding operation on the building menu unfolding control. The display module 801 is configured to display a building menu according to the unfolding operation, the building menu including at least one candidate building. The receiving module 802 is configured to receive a selection operation for selecting one candidate building from the at least one candidate building. Further, the determining module 803 is configured to determine the selected candidate building as the target building.

In summary, this embodiment provides an apparatus for constructing a building in a virtual environment. A first-perspective picture of an application is displayed, and a building joystick control corresponding to a target building is superimposed and displayed on the first-perspective picture. A touch operation triggered on the building joystick control is received. A target construction position of the target building is determined according to the touch operation. A touch release operation corresponding to the touch operation is received. The target building is constructed at the target construction position according to the touch release operation. In the foregoing target building construction process, a user completes, through the building joystick control corresponding to the target building, one touch and release operation to complete the construction of the target building at an aim point position of the first perspective, thereby implementing the fast and efficient construction of the target building in the virtual environment of the application; compared with related target building construction that requires three steps, the foregoing construction process reduces two steps and improves the human-computer interaction efficiency.

Figure 17:
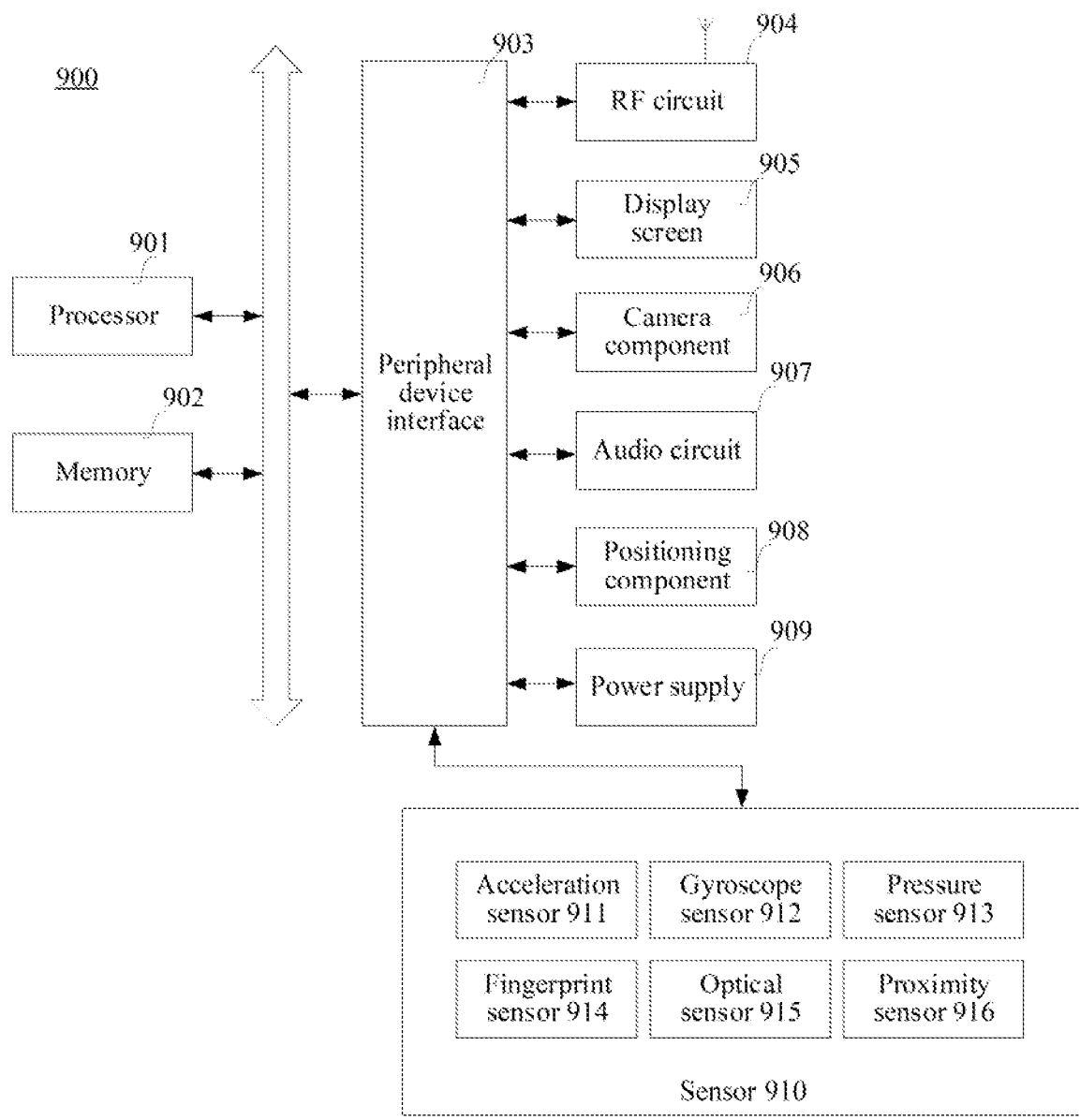
FIG. 17 is a structural block diagram of a device according to an exemplary embodiment of this application.

FIG. 17 is a structural block diagram of a terminal 900 according to an exemplary embodiment of this application. The terminal 900 may be a smartphone, a tablet computer, a Moving Picture Experts Group Audio Layer III (MP3) player, an MP4 player, a notebook computer, or a desktop computer. The terminal 900 may correspond to user equipment, a portable terminal, a laptop terminal, desktop terminal, or other device.

Generally, the terminal 900 includes processing circuitry, such as a processor 901, and a memory 902.

The processor 901 may include one or more processing cores such as a 4-core processor or an 8-core processor. The processor 901 may be implemented by using at least one hardware form of digital signal processing (DSP), a field-programmable gate array (FPGA), and a programmable logic array (PLA). The processor 901 may also include a main processor and a coprocessor. The main processor is a processor configured to process data in an awake state, and can also be referred to as a central processing unit (CPU). The coprocessor is a low power consumption processor configured to process data in a standby state. In some embodiments, the processor 901 may be integrated with a graphics processing unit (GPU). The GPU is configured to render and draw content that needs to be displayed on a display screen. In some embodiments, the processor 901 may further include an artificial intelligence (AI) processor. The AI processor is configured to process computing operations related to machine learning.

The memory 902 may include one or more computer-readable storage media. The computer-readable storage medium may be non-transient or non-transitory. The memory 902 may further include a high-speed random access memory and a non-volatile memory, such as one or more magnetic disk storage devices or a flash storage device. In some embodiments, the non-transitory computer-readable storage medium in the memory 902 is configured to store at least one instruction. The at least one instruction is executed by the processor 901 to perform the method for constructing an object, such as a building, in a virtual environment provided in the method embodiments of this application.

In some embodiments, the terminal 900 may optionally include: a peripheral device interface 903 and at least one peripheral device. The processor 901, the memory 902, and the peripheral device interface 903 may be connected by using a bus or a signal cable. Each peripheral device may be connected to the peripheral device interface 903 by using a bus, a signal cable, or a circuit board. Specifically, the peripheral device includes: at least one of a radio frequency (RF) circuit 904, a touch display screen 905, a camera 906, an audio circuit 907, a positioning component 908, and a power supply 909.

The peripheral device interface 903 may be configured to connect at least one peripheral device related to input/output (I/O) to the processor 901 and the memory 902. In some embodiments, the processor 901, the memory 902, and the peripheral device interface 903 are integrated on the same chip or circuit board. In some other embodiments, any one or two of the processor 901, the memory 902, and the peripheral device interface 903 may be implemented on an independent chip or circuit board. This is not limited in this embodiment.

The RF circuit 904 is configured to receive and transmit an RF signal, which is also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. Optionally, the RF circuit 904 includes: an antenna system, an RF transceiver, one or more amplifiers, a tuner, an oscillator, a digital signal processor, a codec chip set, a subscriber identity module card, and the like. The RF circuit 904 may communicate with other terminals by using at least one wireless communication protocol. The wireless communication protocol includes, but is not limited to: a world wide web, a metropolitan area network, an intranet, generations of mobile communication networks (2G, 3G, 4G, and 5G), a wireless local area network and/or a WiFi network. In some embodiments, the radio frequency circuit 904 may also include a circuit related to near field communication (NFC). This is not limited in this application.

The display screen 905 is configured to display a UI. The UI may include a graph, text, an icon, a video, and any combination thereof. When the display screen 905 is a touch display screen, the display screen 905 is further capable of collecting a touch signal on or above a surface of the display screen 905. The touch signal may be inputted to the processor 901 as a control signal for processing. In this case, the display screen 905 may be further configured to provide a virtual button and/or a virtual keyboard that are/is also referred to as a soft button and/or a soft keyboard. In some embodiments, there may be one display screen 905 disposed on a front panel of the terminal 900. In some other embodiments, there may be at least two display screens 905 respectively disposed on different surfaces of the terminal 900 or designed in a foldable shape. In still some other embodiments, the display screen 905 may be a flexible display screen, disposed on a curved surface or a folded surface of the terminal 900. Even, the display screen 905 may be further set to have a non-rectangular irregular pattern, that is, a special-shaped screen. The display screen 905 may be made of materials such as a liquid crystal display (LCD), and an organic light-emitting diode (OLED).

The camera component 906 is configured to collect images or videos. Optionally, the camera component 906 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera component 906 may further include a flashlight. The flashlight may be a single-color-temperature flashlight or a double-color-temperature flashlight. The double-color-temperature flashlight is a combination of a warm flashlight and a cold flashlight, which may be used for light compensation at different color temperatures.

The audio circuit 907 may include a microphone and a speaker. The microphone is configured to collect sound waves of users and surroundings, and convert the sound waves into electrical signals and input the signals to the processor 901 for processing, or input the signals to the RF circuit 904 to implement voice communication. For the purpose of stereo collection or noise reduction, there may be a plurality of microphones, respectively disposed at different portions of the terminal 900. The microphone may be further an array microphone or an omni-directional collection type microphone. The speaker is configured to convert electrical signals from the processor 901 or the RF circuit 904 into acoustic waves. The speaker may be a conventional thin-film speaker or a piezoelectric ceramic speaker. When the speaker is the piezoelectric ceramic speaker, electric signals not only may be converted into sound waves audible to human beings, but also may be converted into sound waves inaudible to human beings for ranging and other purposes. In some embodiments, the audio circuit 907 may further include an earphone jack.

The positioning component 908 is configured to position a current geographic location of the terminal 900, to implement navigation or a location based service (LBS). The positioning component 908 may be a positioning component based on the global positioning system (GPS) of the United States, the BeiDou system of China, or the Galileo system of Russia.

The power supply 909 is configured to supply power to components in the terminal 900. The power supply 909 may be an alternating current, a direct current, a disposable battery, or a rechargeable battery. When the power supply 909 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 900 further includes one or more sensors 910. The one or more sensors 910 include, but are not limited to: an acceleration sensor 911, a gyroscope sensor 912, a pressure sensor 913, a fingerprint sensor 914, an optical sensor 915, and a proximity sensor 916.

The acceleration sensor 911 may detect a magnitude of acceleration on three coordinate axes of a coordinate system established by the terminal 900. For example, the acceleration sensor 911 may be configured to detect components of gravity acceleration on the three coordinate axes. The processor 901 may control, according to a gravity acceleration signal collected by the acceleration sensor 911, the touch display screen 905 to display the UI in a landscape view or a portrait view. The acceleration sensor 911 may be further configured to collect motion data of a game or a user.

The gyroscope sensor 912 may detect a body direction and a rotation angle of the terminal 900, and may work with the acceleration sensor 911 to collect a 3D action performed by the user on the terminal 900. The processor 901 may implement the following functions according to data collected by the gyroscope sensor 912: motion sensing (for example, the UI is changed according to a tilt operation of the user), image stabilization during shooting, game control, and inertial navigation.

The pressure sensor 913 may be disposed on a side frame of the terminal 900 and/or a lower layer of the touch display screen 905. When the pressure sensor 913 is disposed on the side frame of the terminal 900, a holding signal of the user on the terminal 900 may be detected. The processor 901 performs left and right hand recognition or a quick operation according to the holding signal collected by the pressure sensor 913. When the pressure sensor 913 is disposed on the lower layer of the touch display screen 905, the processor 901 controls, according to a pressure operation of the user on the touch display screen 905, an operable control on the UI. The operable control includes at least one of a button control, a scroll-bar control, an icon control, and a menu control.

The fingerprint sensor 914 is configured to collect a fingerprint of the user, and the processor 901 recognizes an identity of the user according to the fingerprint collected by the fingerprint sensor 914, or the fingerprint sensor 914 recognizes the identity of the user according to the collected fingerprint. When the identity of the user is recognized as credible, the processor 901 authorizes the user to perform a related sensitive operation. The sensitive operation includes unlocking a screen, viewing encrypted information, downloading software, paying, changing a setting, and the like. The fingerprint sensor 914 may be disposed on a front surface, a back surface, or a side surface of the terminal 900. When a physical button or a vendor logo is disposed on the terminal 900, the fingerprint 914 may be integrated with the physical button or the vendor logo.

The optical sensor 915 is configured to collect ambient light intensity. In an embodiment, the processor 901 may control display luminance of the touch display screen 905 according to the ambient light intensity collected by the optical sensor 915. Specifically, when the ambient light intensity is relatively high, the display luminance of the touch display screen 905 is increased. When the ambient light intensity is relatively low, the display luminance of the touch display screen 905 is reduced. In another embodiment, the processor 901 may further dynamically adjust a camera parameter of the camera component 906 according to the ambient light intensity collected by the optical sensor 915.

The proximity sensor 916, also referred to as a distance sensor, is generally disposed on the front panel of the terminal 900. The proximity sensor 916 is configured to collect a distance between the user and the front surface of the terminal 900. In an embodiment, when the proximity sensor 916 detects that the distance between the user and the front surface of the terminal 900 gradually becomes smaller, the touch display screen 905 is controlled by the processor 901 to switch from a screen-on state to a screen-off state. When the proximity sensor 916 detects that the distance between the user and the front surface of the terminal 900 gradually becomes larger, the touch display screen 905 is controlled by the processor 901 to switch from the screen-off state to the screen-on state.

A person skilled in the art may understand that a structure shown in FIG. 17 is merely an example of the terminal 900, and the terminal may include more or fewer components than those shown in the figure, or combine some components, or use a different component deployment.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set, and the at least one instruction, the at least one program, the code set or the instruction set is loaded and executed by the processor to implement the method for constructing an object, such as a building, in a virtual environment according to any one of FIG. 3 to FIG. 15.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose, and are not intended to indicate priorities of the embodiments.

A person of ordinary skill in the art may understand that all or some of the steps in the embodiments may be implemented by hardware or a program instructing relevant hardware. The program may be stored in a computer-readable storage medium. The storage medium may be: a ROM, a magnetic disk, or an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for adding a virtual object in a virtual environment, the method comprising:
    displaying an image of the virtual environment based on a position of a virtual movable object in the virtual environment;
    displaying a graphical element of the virtual object to be added in the virtual environment;
    based on a first continuous touch operation being performed on the graphical element of the virtual object, displaying an object controller corresponding to the virtual object to be added in the virtual environment, the object controller including a control region and the graphical element configured to move within the control region of the object controller according to the first continuous touch operation, a position of the virtual object to be added in the virtual environment being adjusted based on movement of the graphical element within the control region of the object controller according to the first continuous touch operation;
    determining a first position of the virtual object in the virtual environment according to a position of the graphical element within the control region of the object controller when the first continuous touch operation ends; and
    adding the virtual object in the virtual environment at the determined first position of the virtual object.

2. The method according to claim 1, wherein the adding the virtual object comprises:
    building the virtual object to be added in the virtual environment at the determined first position of the virtual object.

3. The method according to claim 2, wherein the adding the virtual object comprises:
    displaying a first virtual model of the virtual object to be added at the determined first position of the virtual object during the building of the virtual object; and
    displaying a second virtual model of the virtual object at the determined first position of the virtual object after the building of the virtual object is completed.

4. The method according to claim 3, further comprising:
    displaying the first virtual model of the virtual object at a plurality of positions in the virtual environment, the plurality of positions being determined based on changes to the position of the graphical element according to the movement of the first continuous touch operation within the control region while the first continuous touch operation is performed.

5. The method according to claim 1, further comprising:
    controlling the position of the virtual movable object in the virtual environment based on a user input via a virtual movable object controller that is different from the object controller corresponding to the virtual object, wherein
    the determining the first position of the virtual object includes determining the first position of the virtual object to be added in the virtual environment according to (i) the position of the graphical element within the control region when the first continuous touch operation ends and (ii) a viewpoint of the virtual movable object in the virtual environment when the first continuous touch operation ends.

6. The method according to claim 1, wherein the graphical element includes a graphical representation of the virtual object.

7. The method according to claim 1, further comprising:
    displaying a cancel control element while the first continuous touch operation is being received;
    receiving a second touch operation on the cancel control element; and
    canceling the adding of the virtual object in the virtual environment in response to the second touch operation.

8. The method according to claim 1, further comprising:
    displaying a continuous add control element while the first continuous touch operation is being received;
    receiving a second touch operation on the continuous add control element;
    determining a second position of the virtual object in the virtual environment according to the position of the graphical element within the control region while the first continuous touch operation and the second touch operation are being received; and
    adding the virtual object in the virtual environment at the determined second position of the virtual object.

9. The method according to claim 1, further comprising:
    displaying an object selection menu display element;
    receiving a user selection of the object selection menu display element;
    displaying an object selection interface according to the user selection of the object selection menu display element, the object selection interface including at least one candidate object; and
    receiving a user selection of the virtual object from the at least one candidate object via the object selection interface.

10. The method according to claim 1, wherein the object controller includes a joystick control element.

11. An apparatus for adding a virtual object in a virtual environment, the apparatus comprising:
    processing circuitry configured to:
        display an image of the virtual environment based on a position of a virtual movable object in the virtual environment;
        display a graphical element of the virtual object to be added in the virtual environment;
        based on a first continuous touch operation being performed on the graphical element of the virtual object, display an object controller corresponding to the virtual object to be added in the virtual environment, the object controller including a control region and the graphical element configured to move within the control region of the object controller according to the first continuous touch operation, a position of the virtual object to be added in the virtual environment being adjusted based on movement of the graphical element within the control region of the object controller according to the first continuous touch operation;

determine a first position of the virtual object in the virtual environment according to a position of the graphical element within the control region of the object controller when the first continuous touch operation ends; and add the virtual object in the virtual environment at the determined first position of the virtual object.

12. The apparatus according to claim 11, wherein the processing circuitry is configured to:

build the virtual object to be added in the virtual environment at the determined first position of the virtual object.

13. The apparatus according to claim 12, wherein the processing circuitry is configured to:

display a first virtual model of the virtual object to be added at the determined first position of the virtual object during the building of the virtual object; and display a second virtual model of the virtual object at the determined first position of the virtual object after the building of the virtual object is completed.

14. The apparatus according to claim 13, wherein the processing circuitry is configured to:

display the first virtual model of the virtual object at a plurality of positions in the virtual environment, the plurality of positions being determined based on changes to the position of the graphical element according to the movement of the first continuous touch operation within the control region while the first continuous touch operation is performed.

15. The apparatus according to claim 11, wherein the processing circuitry is configured to:

control the position of the virtual movable object in the virtual environment based on a user input via a virtual movable object controller that is different from the object controller corresponding to the virtual object; and determine the first position of the virtual object to be added in the virtual environment according to (i) the position of the graphical element within the control region when the first continuous touch operation ends and (ii) a viewpoint of the virtual movable object in the virtual environment when the first continuous touch operation ends.

16. The apparatus according to claim 11, wherein the graphical element includes a graphical representation of the virtual object.

17. The apparatus according to claim 11, wherein the processing circuitry is configured to:

display a cancel control element while the first continuous touch operation is being received;

receive a second touch operation on the cancel control element; and cancel the adding of the virtual object in the virtual environment in response to the second touch operation.

18. The apparatus according to claim 11, wherein the processing circuitry is configured to:

display a continuous add control element while the first touch operation is being received;

receive a second touch operation on the continuous add control element;

determine a second position of the virtual object in the virtual environment according to the position of the graphical element within the control region while the first continuous touch operation and the second touch operation are being received; and add the virtual object in the virtual environment at the determined second position of the virtual object.

19. The apparatus according to claim 11, wherein the processing circuitry is configured to:

display an object selection menu display element;

receive a user selection of the object selection menu display element;

display an object selection interface according to the user selection of the object selection menu display element, the object selection interface including at least one candidate object; and receive a user selection of the virtual object from the at least one candidate object via the object selection interface.

20. A non-transitory computer-readable storage medium, storing instructions which when executed by a processor cause the processor to perform:

displaying an image of a virtual environment based on a position of a virtual movable object in the virtual environment;

displaying a graphical element of a virtual object to be added in the virtual environment;

based on a first continuous touch operation being performed on the graphical element of the virtual object, displaying an object controller corresponding to the virtual object to be added in the virtual environment, the object controller including a control region and the graphical element configured to move within the control region of the object controller according to the first continuous touch operation, a position of the virtual object to be added in the virtual environment being adjusted based on movement of the graphical element within the control region of the object controller according to the first continuous touch operation;

determining a first position of the virtual object in the virtual environment according to a position of the graphical element within the control region of the object controller when the first continuous touch operation ends; and adding the virtual object in the virtual environment at the determined first position of the virtual object.

* * * * *